(12) United States Patent
Harris

(10) Patent No.: US 10,215,434 B2
(45) Date of Patent: Feb. 26, 2019

(54) ADAPTIVE TRIGGER SEQUENCING FOR SITE CONTROL AUTOMATION

(71) Applicant: Think Automatic, LLC, Redmond, WA (US)

(72) Inventor: Stephen Harris, Seattle, WA (US)

(73) Assignee: THINK AUTOMATIC, LLC, Redmond, WA (US)

( * ) Notice: Subject to any disclaimer, the term of this patent is extended or adjusted under 35 U.S.C. 154(b) by 257 days.

(21) Appl. No.: 15/443,970

(22) Filed: Feb. 27, 2017

(65) Prior Publication Data

US 2017/0167746 A1 Jun. 15, 2017

Related U.S. Application Data

(63) Continuation-in-part of application No. 14/073,695, filed on Nov. 6, 2013, now abandoned.

(60) Provisional application No. 61/723,625, filed on Nov. 7, 2012.

(51) Int. Cl.

| G05B 21/00 | (2006.01) |
| --- | --- |
| G01M 1/38 | (2006.01) |
| G05B 13/00 | (2006.01) |
| G05B 15/00 | (2006.01) |
| G05D 23/00 | (2006.01) |
| F24F 11/30 | (2018.01) |
| G05B 19/048 | (2006.01) |
| G05B 13/02 | (2006.01) |
| G06N 99/00 | (2019.01) |
| G05B 15/02 | (2006.01) |
| F24F 11/62 | (2018.01) |
| F24F 110/00 | (2018.01) |
| F24F 120/20 | (2018.01) |
| F24F 11/65 | (2018.01) |
| F24F 11/52 | (2018.01) |

(52) U.S. Cl.
CPC .............. *F24F 11/30* (2018.01); *F24F 11/62* (2018.01); *G05B 13/0265* (2013.01); *G05B 15/02* (2013.01); *G05B 19/048* (2013.01); *G06N 99/005* (2013.01); *F24F 11/52* (2018.01); *F24F 11/65* (2018.01); *F24F 2110/00* (2018.01); *F24F 2120/20* (2018.01); *G05B 2219/2614* (2013.01); *G05B 2219/2642* (2013.01)

(58) Field of Classification Search
USPC ........................................................ 700/275
See application file for complete search history.

(56) References Cited

U.S. PATENT DOCUMENTS

| 7,653,652 | B2 | 1/2010 | Kagalwala et al. |
| 8,032,409 | B1 | 10/2011 | Mikurak |
| 8,386,086 | B2 | 2/2013 | Roux et al. |
| 9,230,263 | B2 | 1/2016 | Tietzen et al. |
| 9,335,818 | B2 | 5/2016 | Ye et al. |
| 9,430,549 | B2 | 8/2016 | Guo et al. |

(Continued)

FOREIGN PATENT DOCUMENTS

DE 102014108374 A1 12/2015

*Primary Examiner* — Mohammad Ali
*Assistant Examiner* — Md Azad
(74) *Attorney, Agent, or Firm* — AEON Law, PPLC; Adam L. K. Philipp; Jonathan E. Olson

(57) ABSTRACT

Disclosed is a method and apparatus for an environmental control system in which a genetic learning algorithm creates scenes and scene triggers and in which a fitness function scores the scenes through end-user interaction.

19 Claims, 15 Drawing Sheets

(56) References Cited

U.S. PATENT DOCUMENTS

| | | |
|---|---|---|
| 9,496,003 B2 | 11/2016 | Gates et al. |
| 9,503,791 B2 | 11/2016 | Pangilinan et al. |
| 9,563,705 B2 | 2/2017 | Sumit et al. |
| 9,569,439 B2 | 2/2017 | Davis et al. |
| 9,576,313 B2 | 2/2017 | Kanigsberg et al. |
| 2006/0020353 A1 | 1/2006 | Gonzales et al. |
| 2007/0061022 A1 | 3/2007 | Hoffberg-Borghesani et al. |
| 2007/0288410 A1* | 12/2007 | Tomkins ................ G06N 3/086 706/42 |
| 2008/0097938 A1* | 4/2008 | Guyon ................... G06F 19/24 706/12 |
| 2013/0151570 A1 | 6/2013 | Sandoval et al. |
| 2014/0075004 A1 | 3/2014 | Dusen et al. |
| 2014/0129032 A1 | 5/2014 | Harris |
| 2014/0344013 A1* | 11/2014 | Karty ................... G06N 3/126 705/7.29 |
| 2015/0161515 A1 | 6/2015 | Matsuoka |
| 2015/0192914 A1* | 7/2015 | Slupik ................... G05B 15/02 700/275 |
| 2015/0332007 A1 | 11/2015 | Rosebraugh |
| 2015/0365480 A1 | 12/2015 | Soto et al. |
| 2016/0277203 A1 | 9/2016 | Jin et al. |
| 2016/0300136 A1 | 10/2016 | Jung et al. |
| 2016/0314120 A1 | 10/2016 | Dauderman et al. |
| 2016/0320078 A1 | 11/2016 | Milder et al. |
| 2016/0334123 A1 | 11/2016 | Humann |
| 2016/0350654 A1 | 12/2016 | Lee |
| 2017/0023918 A1 | 1/2017 | Frazer et al. |

\* cited by examiner

ADAPTIVE TRIGGER SEQUENCING FOR SITE CONTROL AUTOMATION

CROSS-REFERENCE TO RELATED APPLICATIONS

This application claims the benefit of U.S. provisional patent application Ser. No. 61/723,625 (filed 7 Nov. 2012) and U.S. application Ser. No. 14/073,695, both of which are hereby incorporated in their entirety for all purposes.

FIELD

This application relates to environmental control systems.

BACKGROUND

Existing environmental control systems can be used to control individual environmental control devices, such as lights, doors, audio equipment, HVAC equipment, and the like, though the convenience of controlling one device at a time through an environmental control system is not much different than controlling each device via its conventional controller (such as a light switch, a thermostat, a garage door opener, a stereo, etc.).

Existing environmental control systems can be programmed to implement "scenes" by sending commands to multiple environmental control devices. A scene may be programmed for a particular time of day, so that activating a remote control in the morning may trigger a set of lights, setting the HVAC to a certain level, turning on a stereo to a radio station, and starting a coffee maker, whereas activating the remote control in the evening may trigger a different scene which may open the garage door, turn on a different set of lights, set the HVAC to a different level, and the like.

However, scenes can be difficult to program and having two scenes instead of one adds to the system complexity. Exceptions to the program can be programmed, though this results in greater programming complexity as well as remote controls with multiple activation options to account for the exceptions—further adding to the overall system complexity. As a result, changing scene programs can be complex, often requiring service by technicians with special skills to accomplish what should be routine changes.

DETAILED DESCRIPTION

Figure 1:
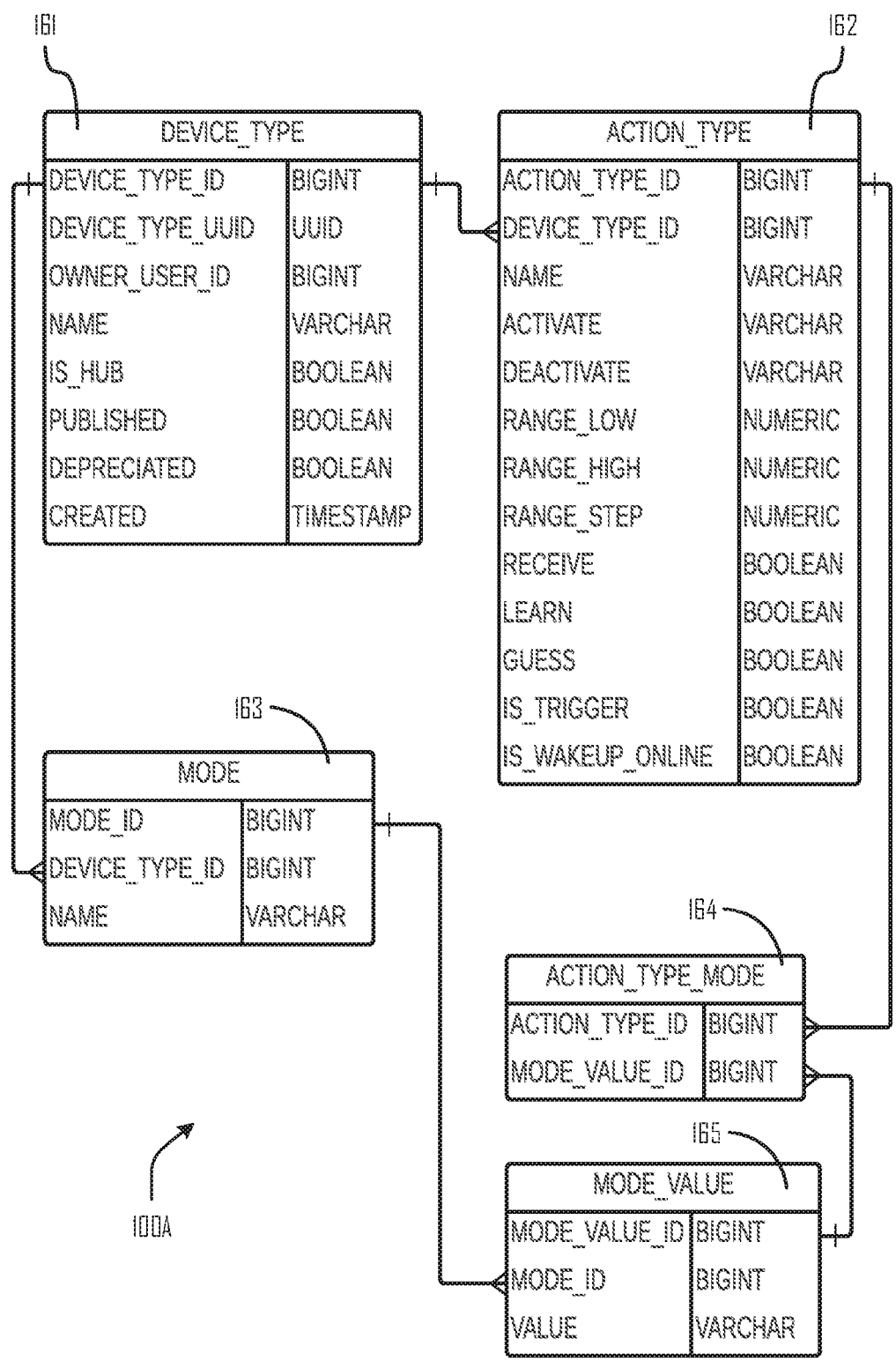
FIG. 1 schematically illustrates a relational database 100 suitable for use within or otherwise accessible to one or more servers according to one or more embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote database servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Associated," "at least," "automatic," "based," "better," "between," "capable," "compatible," "complete," "conditional," "configured," "consecutive," "corresponding," "current," "existing," "false," "first," "having," "higher," "historic," "in," "incompatible," "intermediate," "internal," "local," "lower," "maximum," "minimum," "mitigated," "multiple," "new," "occupied," "on," "other," "overlapping," "partly," "performed," "physical," "proximate," "ranked," "real-time," "remote," "resident," "respective," "responsive," "scalar," "scheduled," "second," "selected," "sequential," "several," "standalone," "successful," "target," "tentative," "third," "triggered," "true," "with," or other such descriptors herein are used in their normal yes-or-no sense, not as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. As used herein, the term "contemporaneous" refers to circumstances or events that are concurrent or at least roughly contemporaneous (on the same day, e.g.).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates a relational database 100 suitable for use within or otherwise accessible to a server. An alphanumeric device type identifier field may reflect a device make and model like "AcmeRockerSwitchSinglePole_321" or "Vizio E24-C1 24″ 1080 p LED Smart HDTV," for example. Each such field value in a respective record of table 161 may map that identifier to one or more instances of universally unique identifiers (UUID), of owner/user identifiers, or of other names as shown. Alternatively or additionally, each such field value may map that identifier to one or more instances of Boolean values (indicating whether the device is configured as a hub, whether it is published, or whether it is depreciated, e.g.) and to a timestamp signifying when that device type was first defined in table 161.

Each value of a device type identifier field may correspond (in a one-to-many relationship, e.g.) to a respective plurality of action type records (in table 162, e.g.). An alphanumeric action type identifier field may reflect an event (of powering on or changing a channel, e.g.) or a status (of being at volume level 19, e.g.) that reflects the device type to which that event or status pertains. Also each such field value in a respective record of table 162 may map that action type identifier to one or more instances of names, of activate terms, of deactivate terms, of range lows, of range highs, or of range step increments. Alternatively or additionally, each such field value may map that identifier to one or more instances of Boolean values (indicating whether the action is compatible with a learn operation, is compatible with a guess operation, is identified as a component of a trigger, or is online as shown, e.g.). Moreover each action type identified may correspond (in a one-to-many relationship, e.g.) to a respective plurality of action-type-specific mode values (in records of table 164, e.g.) as further described below.

Each value of a device type identifier field may likewise correspond (in a one-to-many relationship, e.g.) to a respective plurality of mode records (in table 163, e.g.). An alphanumeric mode identifier field may reflect a mode of operation that reflects the device type to which that event or status pertains. A definition for a thermostat, for example, may include heat, cool, or fan only modes. A definition for a television or stereo system may likewise include a data input source (a channel or local storage medium, e.g.) in some variants. Each mode thus identified may correspond (in a one-to-many relationship, e.g.) to a respective plurality of mode values (in records of table 165, e.g.). Moreover each value of a mode value identifier (in table 165, e.g.) may likewise correspond (in a one-to-many relationship, e.g.) to a respective plurality of action type identifiers records (in table 164, e.g.) as further described below.

Figure 2:
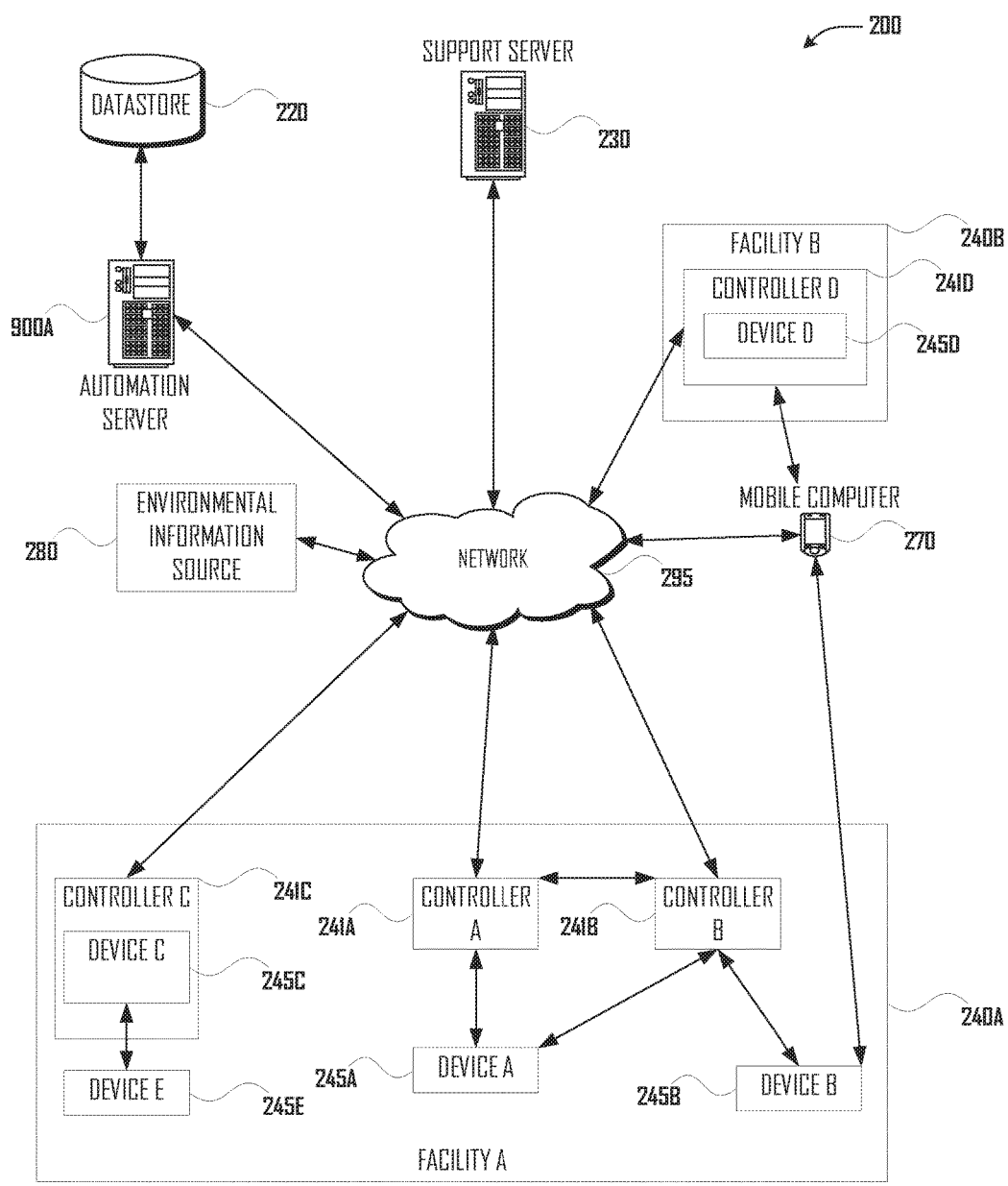
FIG. 2 is a network and device diagram illustrating exemplary computing devices configured according to one or more embodiments.

FIG. 2 illustrates an automation environment 200 comprising exemplary computing devices configured according to one or more embodiments. In FIG. 2, one or more Automation Servers 900, a Support Server(s) 230, a Mobile Computer 270, Controllers 241A-D, and Devices 245A-E, connected to a Network 295, such as the Internet, an Ethernet or X10 network (which may be wireline or wireless), and/or directly to one another. For the sake of convenience, Controllers 241A-D may be discussed collectively as Controllers 241 or as a single Controller 241; similarly, Devices 245A-E may be discussed collectively as Devices 245 or as a single Device 245.

Connection to the Network 295 or direct connection between computing devices may require that the computers execute software routines which enable, for example, the seven layers of the OSI model of computer networking or equivalent in a wireless phone or wireless data network. The Network 295 comprises computers, network connections among the computers, and software routines to enable communication between the computers over the network connections. Communication among the various computers and routines may utilize various data transmission standards and protocols such as, for example, the application protocol HTTP and/or the X10 protocol. Transmitted data may encode documents, files, and data in various formats such as, for example, HTML, XML, flat files, and JSON.

Also illustrated in FIG. 2 are Facilities 240A-B, referred to collectively as Facilities 240 or as a single Facility 240. Examples of Facilities 240 are buildings, campuses, factories, estates, or similar stationary locations or portions thereof suited for occupancy (a room or yard, e.g.). The Facilities 240 comprise Controllers 241 and Devices 245. The Automation Server(s) 900 and the Support Server(s) 230 may be within a Facility 240 or may be remote, relative to one or more of the Facilities 240. In some embodiments, an Automation Server 900 may be incorporated into another computer, such as into a Controller 241.

Devices 245 comprise a range of Devices 245, for example: "dumb" light bulbs attached to a "smart" controllable socket or power outlet, stereo equipment, audio/video output devices (with playlists, pause/play/forward/rewind), garage door openers, door and window sensors, HVAC equipment, and the like. Devices 245 may include computers and may be physically integrated with Controllers 241, such as Controller 241C integrated with Device 245C, or the Devices 245 may be physically separate from the Controller 241, such as Device 245A being physically separate from Controller 241A and Controller 241B. A single Controller 241 may control more than one Device 245, such as Controller 241B controlling Device 245A and Device 245B. A single Device 245 may be controlled by more than one Controller 241, such as Device 245A being controlled by Controller 241A and Controller 241B.

Figure 3:
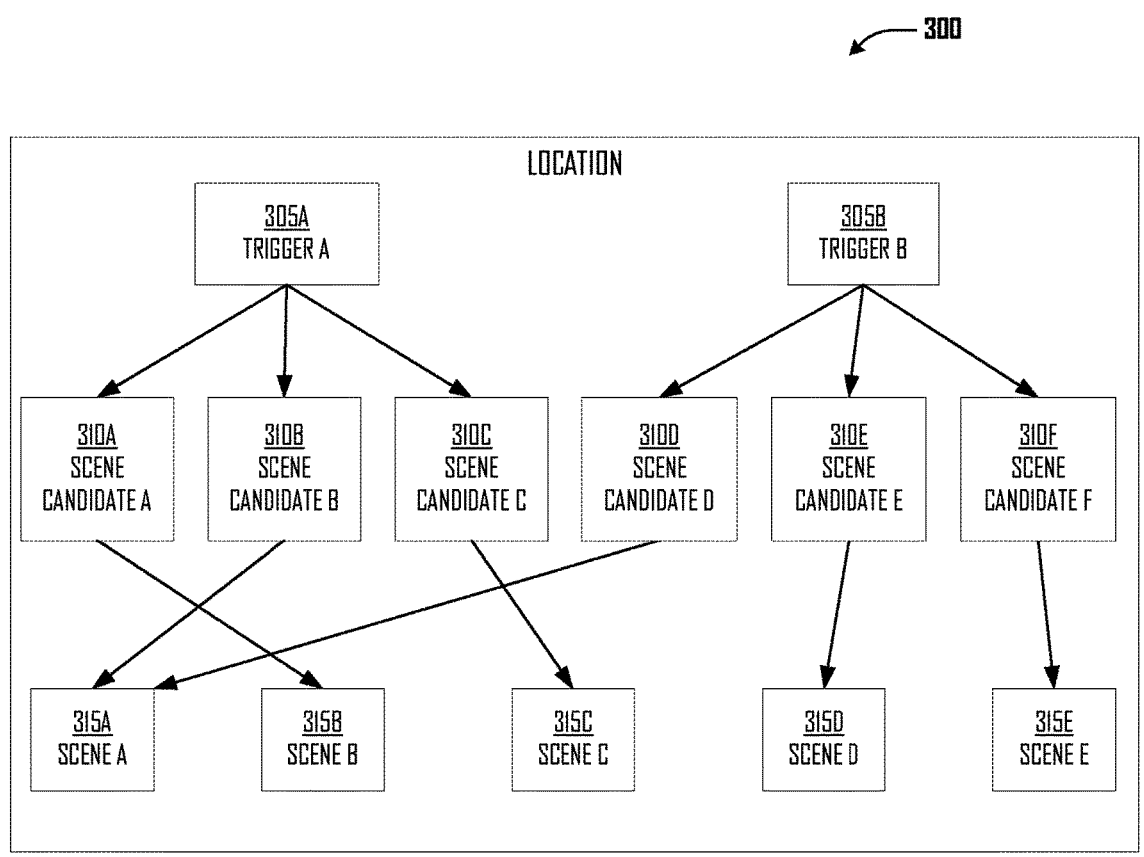
FIG. 3 illustrates Scene Triggers, Scene Candidates, and Scenes, according to one or more embodiments.

FIG. 3 illustrates trigger, scene candidate, and scene scenarios 300. FIG. 3 illustrates trigger 305A and trigger 305B, which both may be examples of trigger records (see FIG. 10). As illustrated in FIG. 3, trigger 305A may be associated with and may be a trigger for scene candidates 310A-310C, while trigger 305B may be associated with and may be a trigger for scene candidates 310D-310F. FIG. 3 illustrates that each scene candidate 310 may each be an output configuration at a site/location. In some contexts a plurality of different scene candidates, such as scene candidate 310B and scene candidate 310D, may both/all be associated with a single output configuration (scene 315A, e.g.). FIG. 3 is discussed further in relation to FIG. 15 and the Genetic Operator Subroutine 1500.

Figure 4:
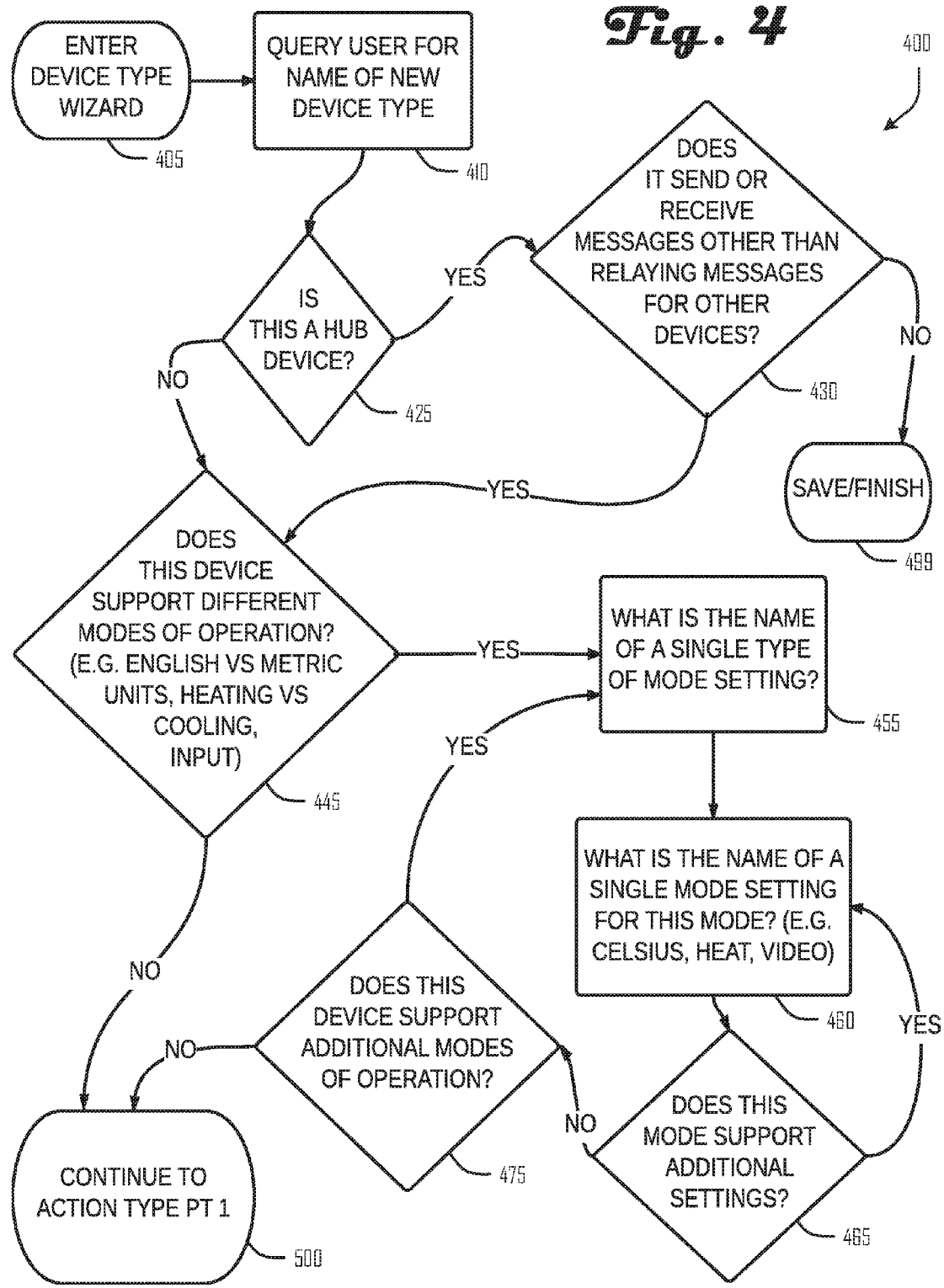
FIG. 4 illustrates structured dialogue suitable for eliciting data from an installer according to one or more embodiments.

FIG. 4 illustrates a structured interaction routine 400 (a "wizard," e.g.) suitable for use in eliciting device type information (see FIG. 1). After a start block 405, at execution block 410 a skilled user (an "installer," e.g.) is queried for a name of a type of a device 245 that has not previously been manifested in the database.

At decision block 415 the installer is queried whether the device is to act as a hub. Control passes to decision block 430 if so and otherwise to decision block 445.

At decision block 430 the installer is queried whether the hub is to handle messages for itself. Routine 400 ends at termination block 499 if not but otherwise control passes to decision block 430.

At decision block 445 the installer is queried whether the device supports more than one mode. Control passes to execution block 455 if so and otherwise to the routine 500 of FIG. 5.

At execution block 455 the installer is queried to provide an identifier of a mode setting type ("units," e.g.) of the device. Control then passes to execution block 460.

At execution block 460 the installer is queried to provide an identifier of a mode setting of the device (allowing an identification of a "heating" or "cooling" mode, e.g.). For a mode setting type of "units," for example, the first mode settings might be "Celsius." Control then passes to decision block 465.

At decision block 465 the installer is queried whether the mode supports any additional settings. Control passes back to execution block 460 (allowing an identification of the second mode setting of "Fahrenheit," e.g.) if so and otherwise to decision block 475.

At decision block 475 the installer is queried whether the device supports any additional modes. Control passes back to execution block 455 (allowing an identification of the second mode setting of "fan only," e.g.) if so and otherwise to the routine 500 of FIG. 5.

Figure 5:
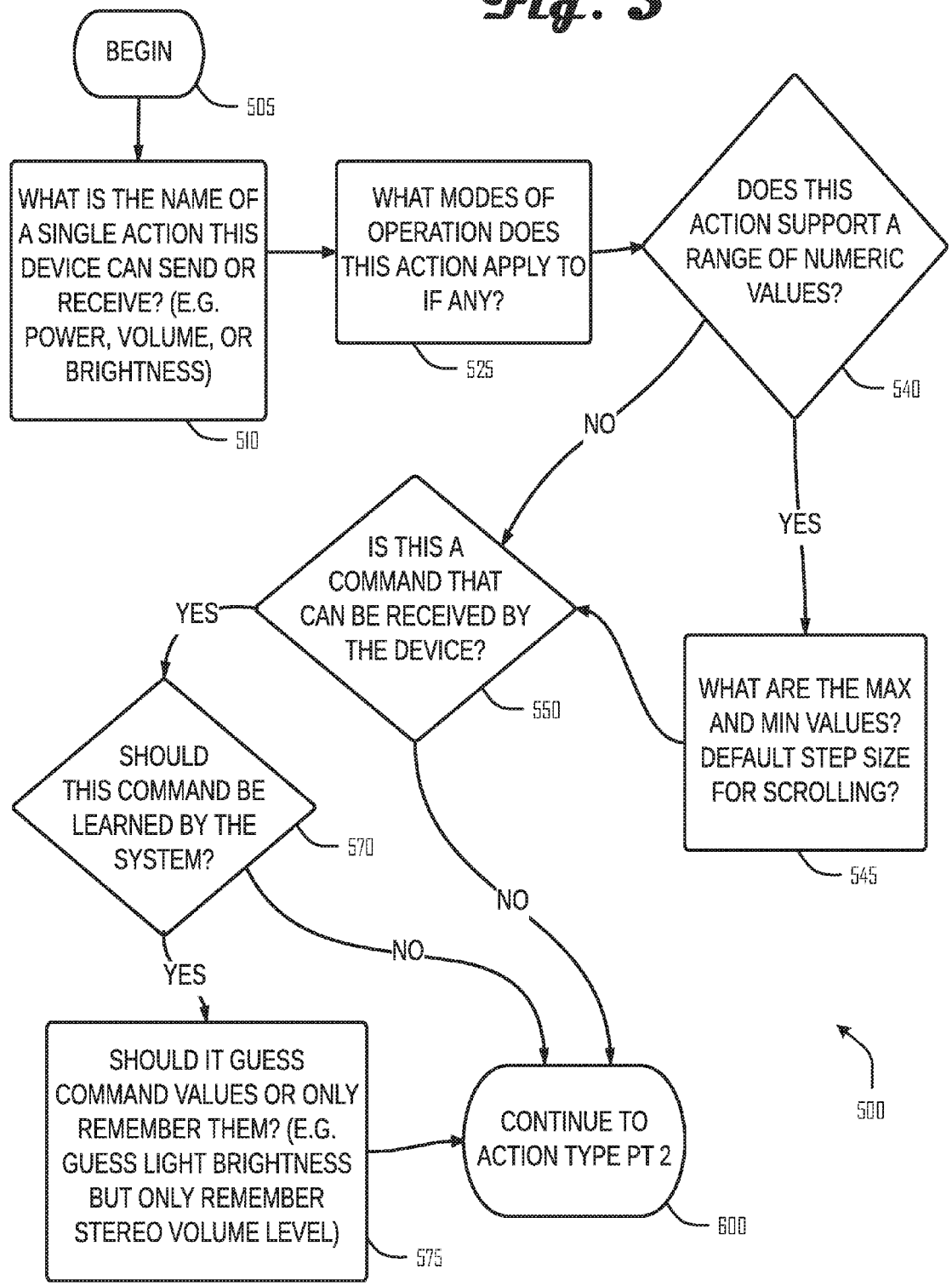
FIG. 5 illustrates additional structured dialogue suitable for eliciting data from an installer according to one or more embodiments.

FIG. 5 illustrates a structured interaction routine 500 (a "wizard," e.g.) suitable for use in eliciting action type information (see FIG. 1). After a start block 505, at execution block 510 the installer is queried for a name of a new action type (that has not previously been manifested for a particular device, e.g.). Then at execution block 525 the installer is queried to identify any modes of operation to which the action may apply. Control then passes to decision block 540.

At decision block 540 the installer is queried whether the action supports a range of quantity-indicative scalar values. Control passes to execution block 545 if so and otherwise to decision block 550.

At execution block 545 the installer is queried to provide a maximum and minimum values for the quantity-indicative scalar variable to which the range applies. Also the user may have an opportunity to specify a default step size for the variable. Control then passes to decision block 550.

At decision block 550 the installer is queried for a determination whether the device is able to accept the action as a command (from one or more hubs local to the device, e.g.). Control passes to decision block 570 if so and otherwise to the routine 600 of FIG. 6.

At decision block 570 the installer is queried for a determination whether the device should receive the action as a command via one or more hubs local to the device. Control passes to execution block 575 if so and otherwise to the routine 600 of FIG. 6.

At execution block 575 the installer is queried for a determination whether the device should guess at command values provided via one or more hubs local to the device. If so then the system can use interpolation or other such speculative techniques for generating command parameters as described herein. If not then the device will be constrained to choose among command parameters previously set by a human being who is operating the device locally (manually, e.g.). Control passes to execution block 575 if so and otherwise to the routine 600 of FIG. 6.

Figure 6:
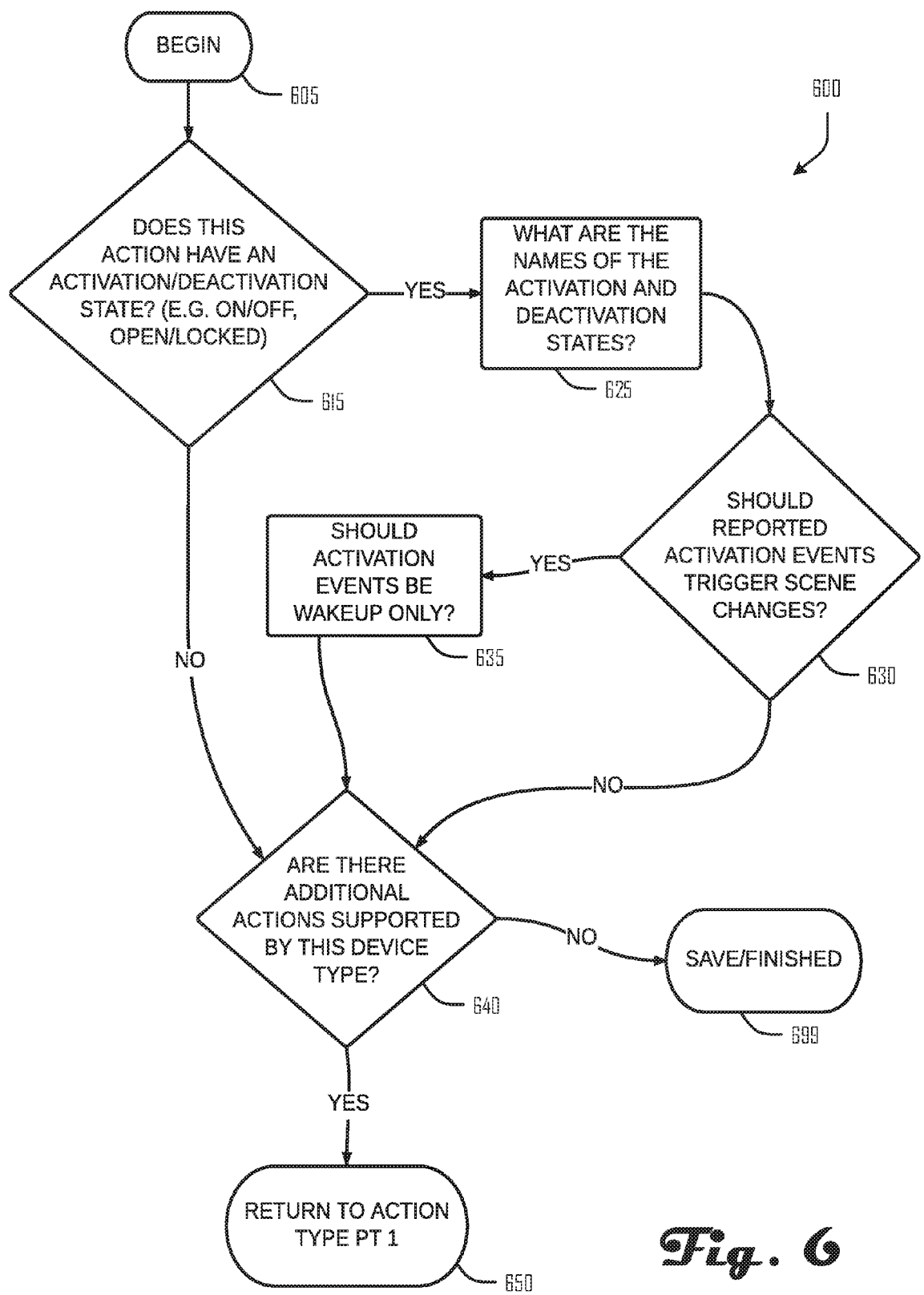
FIG. 6 illustrates additional structured dialogue suitable for eliciting data from an installer according to one or more embodiments.

FIG. 6 illustrates a structured interaction routine 600 suitable for use in eliciting additional action type information (see FIG. 1). After a start block 605, at decision block 615 the installer is queried whether or not the action toggles a binary state. Control passes to execution block 625 if so and otherwise to decision block 640.

At execution block 625 the installer is queried to provide names of the paired binary states. Control then passes to decision block 630.

At decision block 630 the installer is queried for a determination whether toggling between the binary states should trigger scene changes. Control passes to execution block 635 if so and otherwise to decision block 640.

At decision block 640 the installer is queried for a determination whether there are additional actions (not yet entered) supported by the present device type. Control passes back to execution block 510 if so and otherwise routine 600 ends at termination block 699.

Figure 7:
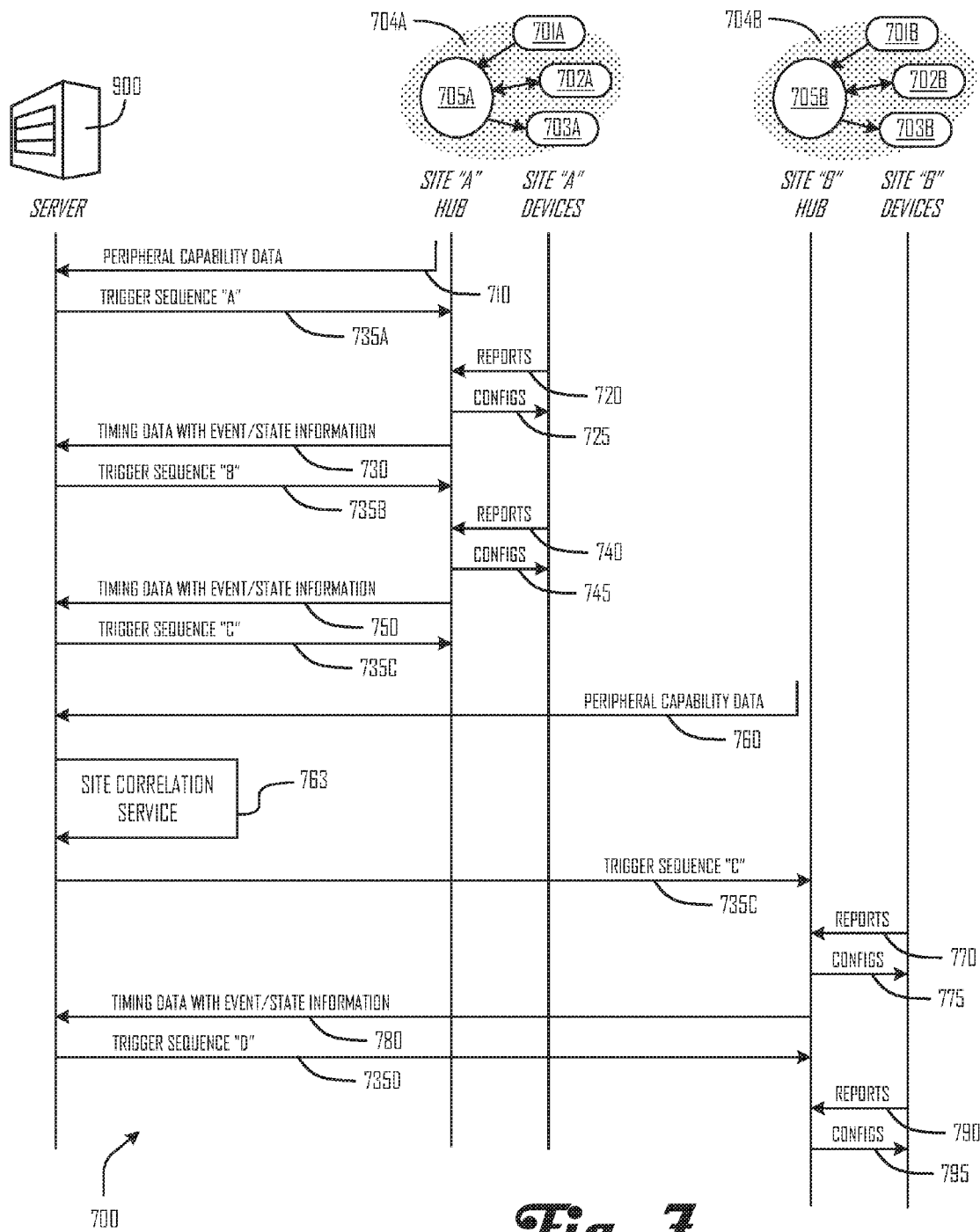
FIG. 7 illustrates a particular scenario and progressive data flow suitable to illustrate one or more embodiments.

FIG. 7 depicts a particular scenario and progressive data flow 700 in which one or more servers 900 (operably coupled through network 295, e.g.) interact with one or more instances of hubs 705, installed devices 701-703, and other onsite client devices. To integrate a new configuration of devices at a given site 704A (defined as a room or other vicinity of devices 701-703 mounted therein, e.g.) into server 900, for example, the installer may create or access a secure account on server 900. An onsite mobile device (a special-purpose tablet computer operated by an installer, e.g.) transmits peripheral capability data 710 at least identifying a particular site 704A (a room or other zone, e.g.) at which several devices 701A, 702A, 703A are operably coupled with a local hub 705A. Once the installer or hub is authenticated to server 900, an identifier of the facility/space (site 704, e.g.) is assigned to an account with which all such participating devices will be associated.

Some new devices may be preconfigured with a universally unique id (UUID) of its specific device type. Many such devices can connect and automatically register themselves with the platform. If server 900 can relate the newly registered device to other resources belonging to the installer's account, such as other local network resources, then a handheld device of the installer may present a notification of a discovery of the new device automatically in real time.

For example, when setting up a smart TV (as an instance of an input/output device 702, e.g.) the installer may connect the TV to a local Wi-Fi network. If the TV knows its own device type UUID and the local Wi-Fi network is known to the platform, then the installer may be automatically notified when the new TV is connected without additional manual action.

If the new device is of a type that server 900 does not recognize, then server 900 invites the installer to facilitate a new device type specification using a device type wizard like that of FIG. 4. Following the wizard, the installer assigns the new device type/species a descriptive name. It also asks the installer if the device is a hub to facilitate routing of messages. In some variants the wizard may query the installer to find out if the new device supports modes of operation, and if so what those modes are as described above.

After determining the modes of operation, one or more wizards (like those of FIGS. 4-6, e.g.) may ask the installer about each of the actions that the device can receive as commands and/or report as events. Each of these actions can represent a binary activation state, a range of values, or an enumeration of values (TV channel name, music genre name, etc.). If the device supports modes of operation, then the installer is prompted to specify each action to be associated with the modes in which the action is supported. For example, a smart TV may have an action for channel number that only applies when in cable TV mode, and have another action (identifying a name of a television program or movie, e.g.) that only applies in a premium or other proprietary content provider name (a "Netflix"® or "Hulu"® mode, e.g.).

Additionally, each action is marked with attributes to help facilitate the machine learning process. If an action is to be reported as an event, for example, the installer may (optionally) be prompted about whether those events should also trigger output configuration changes involving other devices 702, 703. An increased-selectivity mode may be selected for some times-of-day in some contexts. At installer-specified "night" hours, for example, an "occupancy only" mode may be selected. This may allow a scene change that is triggerable during those hours by a narrower set of criteria (by touching a wall switch or activating a hallway-mounted motion sensor, e.g.) to avoid repeated undesired scene changes based on mere movement within a bedroom.

Once the wizard is completed a UUID may be assigned to the new device type by the platform which the installer can then associate with the newly installed device. Once the device is now registered with server 900 (by suitable updates to database 100, e.g.), regardless of which of the previous approaches the installer used, the installer may thereafter assign instances of the particular device to one or more other sites 704B (localized groupings, e.g.) as exemplified below. Once such peripheral capability data 710 is uploaded, server 900 has enough information to discern and learn preferred interactions for and between the devices in each site 704.

Once an adequate composition of device, action, and mode data are known in regard to devices installed at a site 704, server 900 may provide a default trigger sequence 735A that defines a succession of output configurations (scenes 315, e.g.) that hub 705A will use in response to repeated occurrences of a particular trigger 305. When such instances are from an installed input device 701A or an input/output device 702A (as successive adjustments or other actuations thereof, e.g.), for example, each constitutes a respective report 720 in response to which hub 705A may signal the next output configuration 725 according to the default trigger sequence 735A associated with that trigger 305. Meanwhile timing data with event/state information 730, including such reports or calculations thereof, are sent to datastore 220 and in some contexts an improved trigger sequence 735B is provided in response, one that prioritizes the output configuration(s) that the occupants of site 704A settle on (depending upon a current time of week and year, e.g.) for a prolonged period most frequently. Server 900 may generate such improved prioritizations based upon relational database extractions based on an accumulation of such timing data. Server 900 uses this device information and device type information in recording and analyzing the device state information over time. The scene triggering actions may each be scored and tracked, for example, partly based on a timestamp of each historical action (based upon comparisons that depend upon a time-of-day that the historical action occurred, e.g.) and partly based on the scenes that one or more occupants of the site allow to remain (as measured by time intervals between successive timestamps that fall within a suitable mutual proximity, e.g.).

In some variants the scoring and prioritization implemented at server 900 may also be parameterized by other determinants such as time of day, day of week, season, weather, etc. For example, on weekends in December users may be observed to prefer seasonal stations (specific to a current month, e.g.) on their streaming music service as reflected in the calculated scene trigger scores that tend to favor scenes involving holiday-specific media during that time of year.

Partly based on the improved trigger sequence 735B (defining a modified sequence of scenes 315, e.g.) used at hub 705A in response to repeated occurrences of a particular trigger 305. In some contexts the improved trigger sequence may also include a modification of the trigger(s) 305 that pertain to site 704A (manually by an expert in response to aggregated historical data or automatically in response to hardware upgrades at site 704A, e.g.). Additional reports 740 are then received, in response to which hub 705A may signal the next output configuration 725 according to the improved trigger sequence 735B associated with a now-current trigger 305. Meanwhile additional timing data with event/state information 750, including such reports or calculations thereof, are sent to datastore 220 and in some contexts a further-improved trigger sequence 735C is provided in response. Relative to existing technology, rapid scaling of progressive refinements are possible in light of the (regional or other) central aggregation of relational database 100 and by limited central control of trigger sequencing enabled by installers who opt in.

In some contexts, collaborative filtering may be used to improve default sequences or to accelerate such refinements based on the historical data from one or more other sites deemed similar (by an expert or installer, e.g.). By looking at available information (such as individuals' demographics, social media connections, or media genre selections, e.g.) that can identify similarities between occupants, some preferences at one site can be inferred based on preferences of occupants at other sites. For example, the population of scenes at one site involving streaming music genres could be prepopulated and scored based on similar users that have more data points for scoring music genres. When peripheral capability data 760 arrive from another new install site 704B, for example, site correlation service 763 may nominate or otherwise act upon a similarity between site 704B and one or more other sites (including site 704A, e.g.) so as to select and implement the trigger sequence 735C progressively improved over time (by automatic adoption and objectively demonstrated acceptance at site 704A, e.g.) as an improved default sequence to all new sites 704 for which the onsite installer there opts into the centrally controlled resequencing described herein.

Even without any other human involvement, the further-improved default trigger sequence 735C may thus initially control the sequence of output configurations 775 that hub 705B will use in response to repeated occurrences of a particular trigger 305 (manifested as a series of reports 770 or combinations thereof, e.g.) at site 704B. This can occur, for example, in a context in which a local controller 241 or other hub 705B obtains (at least) first, second, and third output configurations (scenes 1020, e.g.) that all correspond to a first trigger 1030 and that are respectively associated with first, second, and third scalar scores (scene trigger scores 1025 or scalar components thereof, e.g.); in which hub 705B presents the output configurations/scenes successively in that order in response to successive instances of the first trigger and to said scalar scores indicating that the output configurations are prioritized/ranked in that order; in which additional timing data with event/state information 780 (reflecting such reports, 770, e.g.) are sent to datastore 220; in which a further-improved trigger sequence 735D (locally optimized upon the further-improved default trigger sequence 735C, e.g.) is provided in response to user preferences manifested in said timing data; and in which hub 705B thereafter presents the trigger sequence 735D (via one or more instances of input/output devices 702B or output devices 703B, e.g.) locally optimized for use at site 704B (modified so that the second output configuration is before the first or after the third, e.g.) in response to the timing data signifying that an occupant of site 704B would apparently favor such a reordering so that subsequent reports 790 will trigger output configurations 795 according to the best available trigger sequence 735D rather than the others.

In light of teachings herein, numerous existing techniques may be applied for configuring special-purpose circuitry or other structures effective for configuring a server to respond to an automatically detected event (by making a data association, e.g.) or other tasks as described herein without undue experimentation. See, e.g., U.S. Pat. No. 9,576,313 ("Recommendation systems and methods using interest correlation"); U.S. Pat. No. 9,569,439 ("Context-sensitive query enrichment"); U.S. Pat. No. 9,563,705 ("Re-ranking results in a search"); U.S. Pat. No. 9,503,791 ("Home screen intelligent viewing"); U.S. Pat. No. 9,496,003 ("System and method for playlist generation based on similarity data"); U.S. Pat. No. 9,430,549 ("Knowledge Capture and Discovery System"); U.S. Pat. No. 9,335,818 ("System and method of personalizing playlists using memory-based collaborative filtering"); U.S. Pat. No. 9,230,263 ("Program, system and method for linking community programs and merchants in a marketing program"); U.S. Pat. No. 8,032,409 ("Enhanced visibility during installation management in a network-based supply chain environment"); U.S. Pat. Pub. No. 20170023918 ("Methods, apparatus, and systems for monitoring and/or controlling dynamic environments"); U.S. Pat. Pub. No. 20160350654 ("Intelligent home system and method"); U.S. Pat. Pub. No. 20160334123 ("Expert system for prediction of changes to local environment"); U.S. Pat. Pub. No. 20160320078 ("Controller and method for multi-zone air heating and cooling system with motorized vents"); U.S. Pat. Pub. No. 20160314120 ("Integrated architecture and network for archiving, processing, association, distribution and display of media"); U.S. Pat. Pub. No. 20160300136 ("Computer-implemented systems utilizing sensor networks for sensing temperature and motion environmental parameters; and methods of use thereof"); U.S. Pat. Pub. No. 20150332007 ("System and method for managing patient environment"); U.S. Pat. Pub. No. 20140075004 ("System and method for fuzzy concept mapping, voting ontology crowd sourcing, and technology prediction"); and U.S. Pat. Pub. No. 20060020353 ("Providing distributed scene programming of a home automation and control system").

Figure 8:
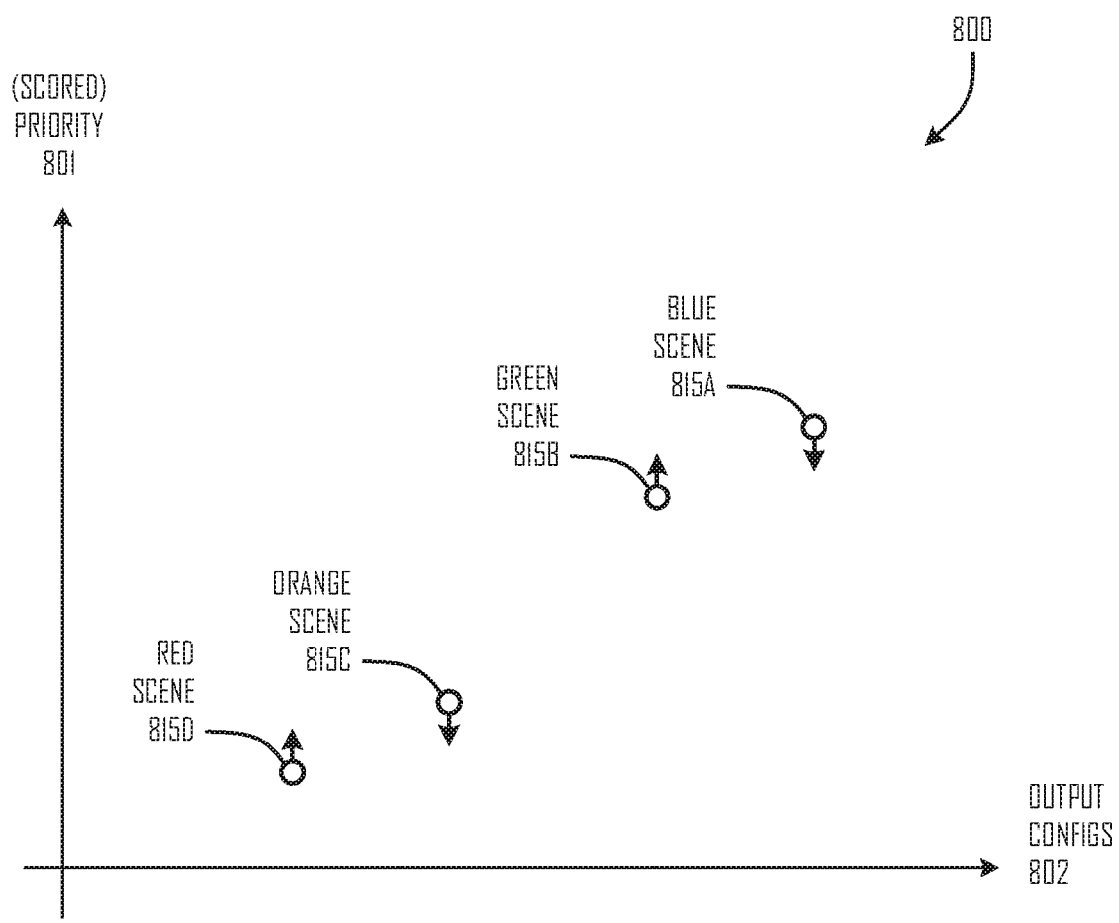
FIG. 8 depicts scene resequencing that may result from incrementally changing priorities according to one or more embodiments.

FIG. 8 is a chart/plot depicting scene resequencing that may result from incrementally changing scores/priorities as described herein. In a context in which several (directly or inversely scored) priorities 801 each reflect a corresponding output configurations 802. If the blue scene 815A and green scene 815B as shown are the first and second output configurations, the relative ranking of these will change if a priority of the blue scene 815A drops enough or if a priority 801 of the green scene 815B rises enough. Likewise if the orange scene 815C and red scene 815D as shown are the lowest eligible output configurations, the relative ranking of these will change if a priority of the orange scene 815C drops enough or if a priority 801 of the red scene 815D rises enough. Several permutations of first, second, and third output configurations being resequenced by incrementally shifting scores/priorities are evident in chart 800.

Figure 9:
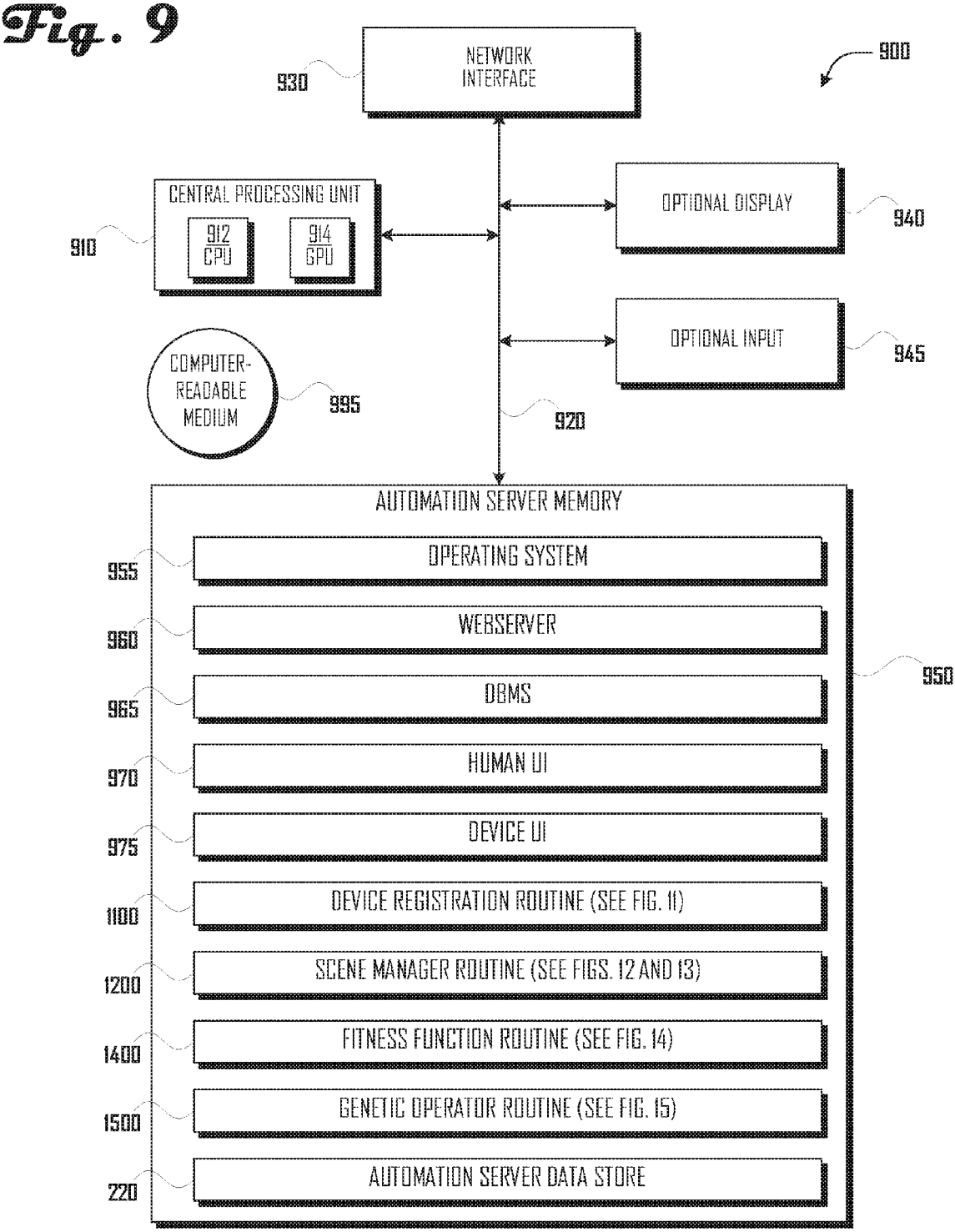
FIG. 9 is a functional block diagram of an Automation Server computing device, according to one or more embodiments.

FIG. 9 is a functional block diagram of an exemplary Automation Server(s) 900 computing device and some data structures and/or components thereof. The computing device 900 in FIG. 9 comprises at least one Processing Unit 910, Automation Server Memory 950, and an optional Display 940, all interconnected along with the Network Interface 930 via a Bus 920. The Network Interface 930 may be utilized to form connections with the Network 295 and to send and receive radio frequency ("RF") and other wireless and wireline signals.

The Automation Server Memory 950 generally comprises a random access memory ("RAM"), a read only memory ("ROM"), and a permanent mass storage device, such as a disk drive or SDRAM (synchronous dynamic random-access memory). The Automation Server Memory 950 stores program code for software routines, such as, for example, a Webserver 960 routine, a DBMS 965 routine, a Human UI 970 routine, a Device UI 975 routine, a Device Registration Routine 1100, a Scene Manager Routine 1200, a Fitness Function Subroutine 1400, and a Genetic Operator Subroutine 1500, as well as browser, webserver, email client and server routines, camera, gesture and glance watching applications, other client applications, and database applications. In addition, the Automation Server Memory 950 also stores an Operating System 955. These software components may be loaded from a non-transient Computer Readable Storage Medium 995 into Automation Server Memory 950 of the computing device using a drive mechanism (not shown) associated with a non-transient Computer Readable Storage Medium 995, such as a floppy disc, tape, DVD/CD-ROM drive, memory card, or other like storage medium. In some embodiments, software components may also or instead be loaded via a mechanism other than a drive mechanism and Computer Readable Storage Medium 995 (e.g., via Network Interface 930).

The computing device 900 may also comprise hardware supported input modalities, Input 945, such as, for example, a touchscreen, a keyboard, a mouse, a trackball, a stylus, a microphone, accelerometer(s), compass(es), RF receivers (to the extent not part of the Network Interface 930), and a camera, all in conjunction with corresponding routines.

Figure 10:
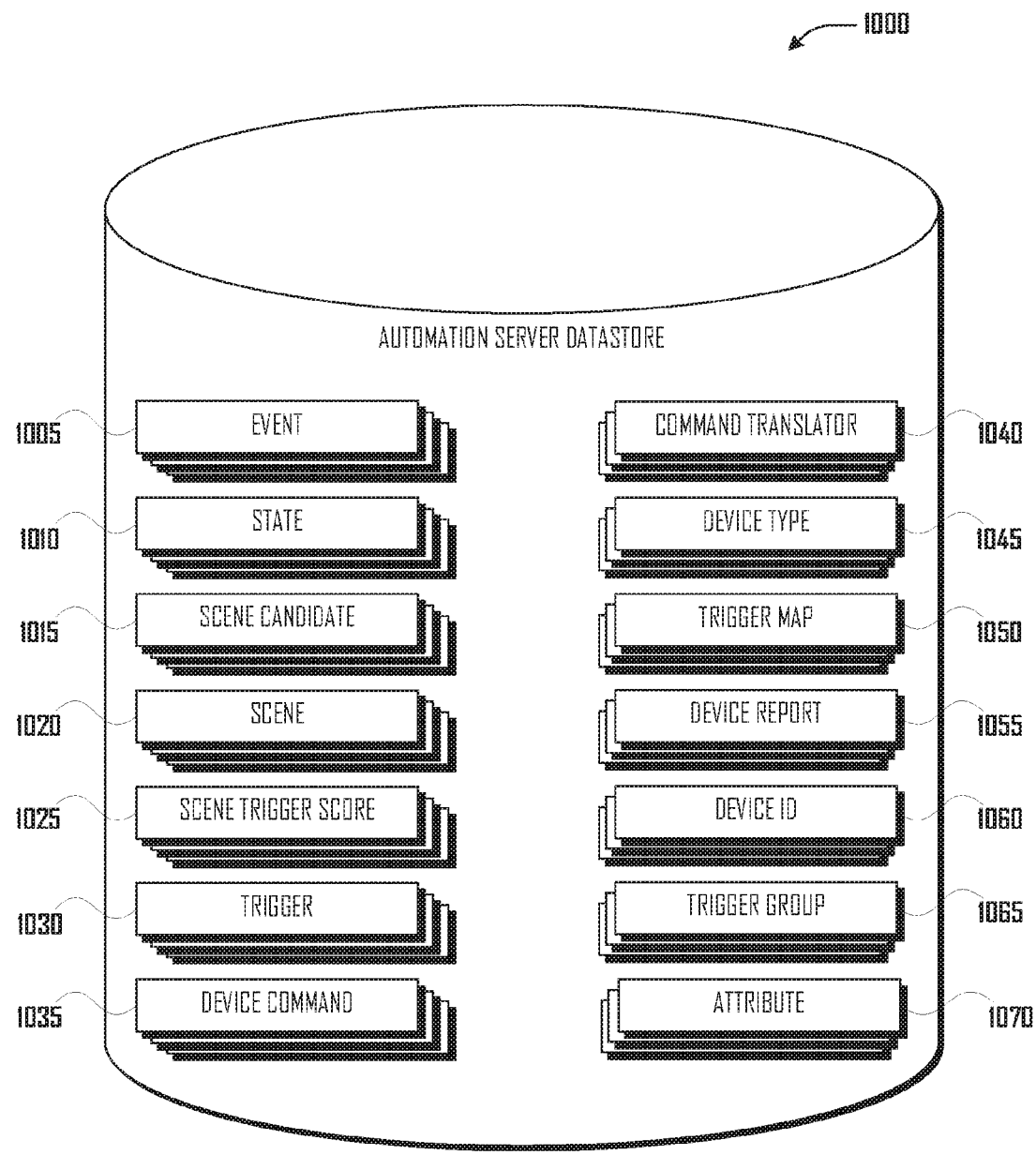
FIG. 10 is a functional block diagram of the Automation Server Datastore, according to one or more embodiments.

The Automation Server(s) 900 may also comprise or communicate via Bus 920 with Automation Server Datastore 1000, illustrated further in FIG. 10. In various embodiments, Bus 920 may comprise a storage area network ("SAN"), a high speed serial bus, and/or via other suitable communication technology. In some embodiments, Automation Server(s) 900 may communicate with the Automation Server Datastore 1000 via Network Interface 930. The Automation Server(s) 900 may, in some embodiments, include many more components than those shown in this Figure. However, it is not necessary that all of these generally conventional components be shown in order to disclose an illustrative embodiment.

Among the embodiments disclosed herein are environmental control systems in which a genetic learning algorithm creates scenes and scene triggers and in which a fitness function scores the scenes through end-user interaction. Genetic learning algorithms may iteratively execute a fitness function against a genetic representation of a problem to be solved, for example. The fitness function may select a best set of outcomes (defined according to the genetic representation of the problem, e.g.) in each "generation" or round of testing, combines parameters from the best outcomes, and returns to the starting point to select the best set of outcomes in the then-current generation. The process may iterate for a fixed number of generations or until the outcome stabilizes within a certain range. A well designed genetic learning algorithm may arrive at a stable outcome so long as the parameters of the problem to be solved remain unchanged. If the parameters of problem to be solved are perturbed, the genetic learning algorithm may iterate toward a new, potentially stable, outcome. Genetic learning algorithms are typically utilized in contexts where the computational demands of a traditional mathematical approach would be too great.

However, defining the genetic representation of the problem and the fitness function is not straight-forward. If the fitness function is too rigorous, for example, the genetic learning algorithm may arrive too quickly at and not move off of a clearly sub-optimal solution. If the fitness function is not rigorous enough or if the genetic representation of the problem includes too many variables or non-linear interaction among the variables, the genetic learning algorithm may never arrive at or may arrive too slowly at a stable solution.

FIG. 10 is a functional block diagram of the Automation Server Datastore 1000, according to one or more embodiments. The components of the Automation Server Datastore 1000 are data groups used by routines and are discussed further herein in the discussion of other of the Figures.

In addition to the data groups used by routines illustrated in FIG. 10, login credentials and local instances of customer and user profiles may be stored in or be accessible to all of the computing devices illustrated in FIG. 2, such as in the Automation Server Datastore 900, the Support Server(s) 230, the Controllers 241, the Devices 245, and the Mobile Computer 270.

The Automation Server(s) 900 is illustrated in FIG. 9 as comprising data groups for routines, such as routines for Device Registration Routine 1100, the Scene Manager Routine 1200, the Fitness Function Subroutine 1400, and the Genetic Operator Subroutine 1500. These routines are discussed at greater length herein, though, briefly, the Device Registration Routine 1100 is a software routine which registers Devices and Controllers on first contact with Automation Server 900 and periodically thereafter as necessary. The Scene Manager Routine 1200 is a routine which receives and processes Device Reports 1055, scores Scenes 1020 according to the Fitness Function Subroutine 1400, triggers Scenes 1020 in response to Triggers 1030 in Device Reports 1055, and generates new Scenes 1020 and Scene Candidates 1015 via the Genetic Operator Subroutine 1500. The Fitness Function Subroutine 1400 scores the Scenes 1020 according to various criteria—such as how long an output configuration/scene was active for—developing a Scene Trigger Score 1025. The Genetic Operator Subroutine 1500 determines Scene Candidates 1015.

Additional data groups for routines, such as for a webserver and web browser, may also be present on and executed by Automation Server 900. Webserver and browser routines may provide an interface for interacting with the other computing devices illustrated in FIG. 2, such as with the Support Server(s) 230, the Controllers 241, the Devices 245, and the Mobile Computer 270 (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

Referring again to FIG. 2, Devices 245 can experience "Events" and "States," such as Events 1005 and States 1010. Examples of Events 1005 and States 1010 (without distinguishing between the two) include a Device 245 turning on or off, a change in power output (such as a change in the level of a dimmable light), a change in power output relative to a threshold (a change below a threshold may be a State 1010; a change above a threshold may be an Event 1005), a door or window being open or closed (as, for example, detected by a sensor or as controlled by an opening mechanism), starting, stopping, or pausing playback, changing a channel or playlist, a change in a temperature setting determined by the Device 245, and similar. Events 1005 are generally more significant than changes in State 1010, though an Event 1005 in one Device 245 may "merely" be a change in State 1010 in another Device 245. Events 1005 can be Triggers 1030 for Scenes 1020, whereas States 1010 are not Triggers 1030 for Scenes 1020 ("Scenes 1020" are defined further below; in its simplest form, Scenes 1020 comprise one or more Devices 245 in a Facility 240 being set to particular Event 1005 and State 1010 settings). An Event 1005 from a first Device 245 which is also a Trigger 1030 for a Scene 1020 (not all Events 1005 are necessarily Triggers 1030), will trigger a Scene 1020, which Scene 1020 will (usually) involve a change in State 1010 and/or Event 1005 for second, third, etc., Devices 245. Triggered Scenes 1020 are implemented via Device Commands 1035, which may be translated by the Command Translator 1040 records into commands in the format, syntax, or language utilized by the Device 245 (and/or a Controller 241 controlling a Device 245). The Device Commands 1035 may be formatted according to, for example, XML or JSON syntax and schema. An Event 1005 which is not a Trigger 1030 will not cause a change in State 1010 and/or Event 1005 for second, third, etc., Devices 245.

Events 1005 and States 1010 in Devices 245 are reported to Automation Server 900 by Controllers 241 via Device Reports 1055. Whether information in a Device Report 1055 relates to an Event 1005 or a State 1010 may, for example, be according to the Device Report 1055, which Device Report 1055 may include flags, parameters or other values to communicate the distinction. Whether information in a Device Report 1055 relates to an Event 1005 or a State 1010 may, for example, be determined by Automation Server 900 by cross-referencing an identifier of a Device 241, such as a Device Type 1045 record in a Device Report 1055, which Device Type 1045 record may be utilized to determine whether the information in the Device Report 1055 relates to an Event 1005 or State 1010. The distinction between Events 1005 and States 1010 and the definition of which Events 1005 are Triggers 1030 may be according to instructions from or associated with the Device 245, a device driver, a Controller 241, or through user preferences received by Automation Server 900 and/or the Scene Manager Routine 1200 and/or the Human UI 970. Events 1005 and States 1010 may be controlled directly at the Device 245, without a Controller 241, provided, however, that for a Device 245 to participate in the system disclosed herein, the Events 1005 and States 1010 experience by the Device 245 must at least be reported or reportable to Automation Server 900 by a Controller 241 through a Device Report 1055.

The Controllers 241 illustrated in FIG. 2 are computers (ranging from relatively simple single-purpose computers to general purpose computers) which communicate with Automation Server 900, with Support Server 230, and with other Controllers 241 (such as the Mobile Computer 270 or between Controller 241A and Controller 241B) and which control the Devices 245. The Controllers 241 may control the Devices 245 and the Events 1005 and States 1010 thereof, such as by issuing Device Commands 1035, and must at least report Events 1005 and States 1010 to Automation Server 900; reporting may occur, for example, as Events 1005 and States 1010 occur, in response to polling, or on a schedule.

The Controllers 241 may be part of the Devices 245, such as Controller 241C illustrated as being part of Device 245C and Controller 241D illustrated as being part of Device 245D. The Controllers 241 may be physically separate from the Devices 245, such as Controller 241A being physically separate from Device 245A or Controller 241B being physically separate from Device 245A and Device 245B. The Controller 241 may control the Device 245 and poll the Device 245 for information by issuing commands to the Device 245, such as via commands transmitted by wireline or wireless technologies (including X10, IR, WIFI, Ethernet, Zigbee, Z-Wave, Insteon, and other wireline and wireless technologies) or the Controller 241 may control the Device 245 by, for example, controlling a controllable power outlet or switch to which the Device 245 may be connected. More than one Controller 241 may control and/or report on more than one Device 245. For example, Controller 241A in Facility 240A controls Device 241A while Controller 241B in Facility 240A controls Device 245A and Device 245B.

A combined Controller 241 and Device 245 may, for example, take the form factor of a wall switch which a user can toggle to control another Device 245 connected to the wall switch, such as a light bulb in a controllable socket. Toggling the wall switch may, for example, be an Event 1005 which is a Trigger 1030 for a Scene 1020 which turns on the light bulb at a first power level. A second Scene 1020 associated with the wall switch Event 1005/Trigger 1030 may turn the light bulb to a second (for example, dimmer) power level and may turn on a playlist in a stereo; the second Scene 1020 may be accessed by toggling the wall switch additional times (see discussion, below, regarding the Scene Manager 1400 routine). A dimming-control on the wall switch or in the controllable socket, controlled independently or via the wall switch, may control the power level of the light bulb; a Controller 241 in the assembly may report the power level to Automation Server 900 via a Device Report 1055, which change in power level may be an Event 1005 and a Trigger 1030 for the second Scene 1020. This example is illustrated in FIG. 2 by Controller 241C, physically integrated with Device 245C, and controlling Device 245E. Another example of a combined Controller 241 and Device 245 is a video playback Device 245 (such as a computer, DVD, and/or streaming media player) which comprises a Controller 241 which allows the video playback Device 245 to report Events 1005 and States 1010 which may be Triggers 1030 for other Scenes 1020 and which allows the video playback Device 245 to be controlled remotely, by Automation Server 900.

Whether physically joined or separate, the Controller 241 and Devices 245 must be logically connected, with the Controller 241 able to control and/or report the Device 245 Events 1005 and States 1010. The Controller 241 must be able to control and/or obtain Events 1005 and States 1010 for the Devices 245 controlled by the Controller 241, which Events 1005 and/or States 1010 are reported by the Controller 241 in Device Reports 1055 to Automation Server 900. The Controller 241 and/or Automation Server 900 must be able to issue Device Commands 1035 to the Devices 245 and/or Controllers 241 to implement Scenes 1020.

The Mobile Computer 270 illustrated in FIG. 2 may be used as a Controller 241 and may comprise a cellular telephone, smartphone, laptop computer, tablet computer, or other computer which is configured to control Devices 245, either directly (as illustrated by the connection to Device 245B) or via Automation Server 900 (via Network 295) or, as illustrated, via a connection to another Controller 241 (such as Controller 241D).

The Automation Server(s) 900 is illustrated herein as comprising software routines for a Webserver 960, dbMS 965 (short for "database management system"), a Human UI 970 ("UI" being short for "user interface"), and a Device UI 975. The Support Server(s) 230 comprises software routines for a Webserver, a Human UI, and a Device UI, among other routines. The Mobile Computer 270 comprises software routines for a Human UI and the Device UI, among other routines. The Controllers 241 comprise software routines for a Human UI and the Device UI, among other routines. The Devices 245 may comprise software routines for a Device UI, among other routines.

The Human UI, such as Human UI 970, may be, for example, a user interface for a human in any of the Controllers 241, a webpage (enabled by a browser routine), the display output by an application on a Mobile Computer (such as on Mobile Computer 270), and the user interface of a remote control for a Device 245; the Human UI 970 provides an interface between the Controllers 241 and a human operator, either directly or via Automation Server 900.

The Device UI 975 may comprise Event 1005 and State 1010 information and Device Commands 1035 communicated to/from the Device 245 as well as commands required to control the Controllers 241 and Devices 245 and to thereby execute Scenes, such as Scene 1020, across a heterogeneous population of Controllers 241 and Devices 245, all communicating with Automation Server 900. Scenes 1020 comprise one or more Devices 245 in a Facility 240 being set to particular Event 1005 and State 1010 settings. Scenes 1020 are implemented by Automation Server 900 issuing a set of Device Commands 1035, which may be converted by the Command Translator 1040 into commands in the syntax native or unique to the Controller, which then implements the commands in the Device 245 via the Device UI. Scenes 1020 may be triggered by Triggers 1030; Triggers 1030 comprise certain Events 1005 experienced by Devices 245, which Events 1005 have been defined to be Triggers 1030. Device Commands 1035 comprise the commands available to be issued to a Device 245 by a Controller 241 and/or by Automation Server 900; Device Commands 1035 may relate to Events 1005 or States 1010.

The Webserver 960 (and a Webserver in the Support Server(s) 230 and/or Controllers 241) may be used to provide communication between and among Automation Server 900, the Support Server(s) 230, and the Controllers 241. The Webserver 960 may also provide backend services for the various Human UI 970 and Device UI 975 instances.

FIG. 2 illustrates Automation Server 900 as being connected to a database computer (implementing datastore 220, e.g.). This paper discusses components as connecting to Automation Server 900 or to a database 100 resident in datastore 220; it should be understood that such connections may be to, through, or via the other of the two components (for example, a statement that a computing device connects with or sends data to Automation Server 900 should be understood as saying that the computing device may connect with or sends data to Automation Server 900 and/or database 100). Although illustrated as separate components, the servers and databases may be provided by common (or separate) physical hardware and common (or separate) logic processors and memory components.

Database 100 is illustrated as comprising database records for Events 1005, States 1010, Scene Candidates 1015, Scenes 1020, Scene Trigger Scores 1025, Triggers 1030, Device Commands 1035, Command Translators 1040, Device Types 1045, Trigger Map 1050, Device Reports 1055, Device IDs 1060, Trigger Group 1065, and Attributes 1070. All records referred to herein (in database 100 and other computer components) may be represented by a cell in a column or a value separated from other values in a defined structure (such as in a flat text file). Though referred to herein as individual records, the records may comprise more than one database or other entry. The records may be, represent, or encode numbers, binary values, logical values, text, or similar; the records may be configured to derive information from other records through operations such as joins, filters, concatenations, mathematical operations, string operations, date-time operations, tests, and similar.

Also illustrated in FIG. 2 is a Support Server(s) 230. Not shown, the Support Server(s) 230 may be connected to a database similar to database 100. Similar to Automation Server 900, the Support Server(s) 230 may comprises software routines for a Webserver, a Human UI, a Device UI, and a dbMS. The Support Server(s) 230 may perform some of the operations described herein as being performed by Automation Server 900.

Also illustrated in FIG. 2 is an Environmental Information Source 280. The Environmental Information Source 280 may be a source of information regarding environmental conditions, such as the weather, ambient light, ambient temperature, and the like. The Environmental Information Source 280 may be in a Facility 240 or may be remote. The Environmental Information Source 280 may be a weather station, a weather reporting device, a weather service, or the like.

Figure 11:
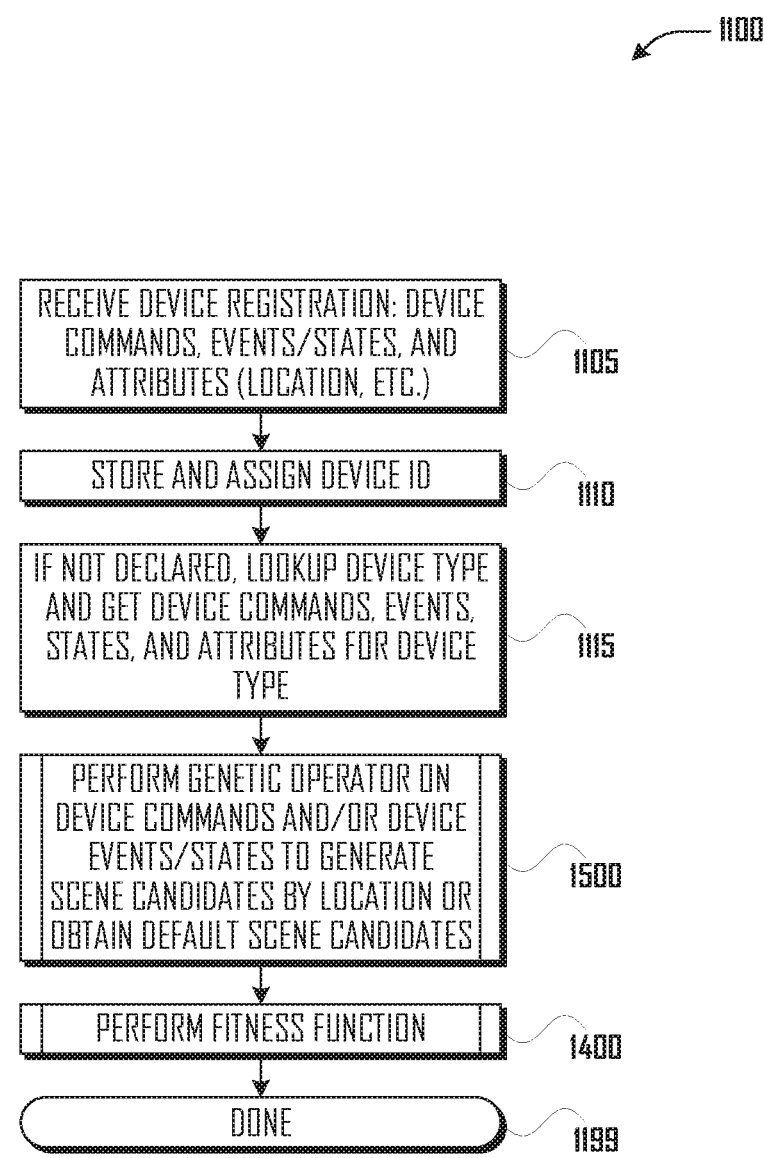
FIG. 11 illustrates a flow of an example Device Registration Routine, according to one or more embodiments.

FIG. 11 illustrates a Device Registration Routine 1100. At block 1105 the Device Registration Routine 1100 receives a communication from one or more Controllers 241, such as a first Controller 241 controlling a light bulb Device 245, which communication may be via the Device UI 975. The communication conveys information relating to the first Controller 241 and/or a first Device 245 attached to or part of the first Controller. The information conveyed may include Device Commands 1035 which may be categorized as Events 1005 and/or States 1010 for the first Controller 241 and/or Device 245; as noted, the communication may or may not distinguish between an Event 1005 or State 1010, but may provide information, such as a list of Device Commands 1035, which is categorized in this manner by Automation Server 900 (such as according to the Device Type 1045, the Device UI 975, and/or the Command Translator 1040). The Event 1005/State 1010 information may comprise the then-current Event 1005 and State 1010 status of the first Controller 241 and/or first Device 245 and/or may comprise a list of Device Commands 1035 available to be issued to or by the first Controller 241 and/or first Device 245.

At block 1105 the first Controller 241 or a second Controller 241, such as the Mobile Computer 270, may also communicate Attributes 1070 of the first Controller 241 and/or first Device 245, such as the Facility 240 in which the first Controller 241 or Device 245 is present, a Device Type 1045 of the first Controller 241 and/or first Device 245, identifier(s) of the first Controller 241 and first Device 245, such as a MAC address or other reasonably unique identifier for one or both of the first Controller 241 and first Device 245, a name of the Controller 241 or Device 245, and Attribute 1070 or Attribute 1070 parameters such as, for example, "Learn" (signifying that the Device or Controller participates in the Scene Manager Routine 1200), "IsTrigger" (signifying that an Event 1005 is a Trigger 1030) or "Show" (signifying that the Controller or Device may be shown in the Human UI 970). The Mobile Computer 270 or other Controller 241 may be paired with the first Controller 241, such as by input of a code into one or both. The first Controller 241 and first Device 245 may also be paired with one another.

At block 1110, the Device Registration Routine 1100 may store the information received at block 1105 and may assign a Device ID 1060 to the first Device 245 and/or to the first Controller 241. The assigned Device ID 1060 may be sent to the first Controller 241 and/or first Device 245 for use by such computer in future communications and/or the assigned Device ID 1060 may be associated with the identifier Attribute 1070 received at block 1105.

At block 1115, if not declared at block 1105, the Device Registration Routine 1100 may look up the Device Type 1045 in a local or remote table or list of Device Types 1045 (if a Device Type 1045 was not obtained in block 1105, this lookup may be performed after looking up a Device Type 1045 corresponding to the reasonably unique identifier for one or both of the first Controller 241 and first Device 245 received at block 1105) and obtain Device Commands 1035, Events 1005 and/or Events 1005/Triggers 1030 and States 1010 associated with the Device Type 1045 of the first Device. Alternatively, and as noted, at block 1105 the Device Registration Routine 1100 may lookup or receive identification of Device Commands 1035, Events 1005 and/or Events 1005/Triggers 1030, and States 1010 associated with the first Device. As noted, one or more of the Events 1005 may be Triggers 1030 for Scene Candidates 1015.

At block 1500, the Device Registration Routine 1100 may invoke the Genetic Operator Subroutine 1500 to generate Scene Candidates 1015 in relation to the Devices 245 and/or Controllers 241 for which information was obtained at step 1105 and/or 1115. Alternatively, the Device Registration Routine 1100 may obtain a default set of Scene Candidates 1015 for the Device Commands 1035 and/or Events 1005/Triggers 1030 obtained at step 1105 and/or 1115.

At block 1400, the Device Registration Routine 1100 may invoke the Fitness Function Subroutine 1400, to determine a Score for the Scene Candidates 1015 generated at block 1500. If this is the first iteration of the Fitness Function Subroutine 1400 relative to a Device 245 and/or Triggers 1030, all of the Scene Candidates 1015 may assigned the same Scene Trigger Score 1025 or a default set of Scene Trigger Scores 1025 may be assigned to the Scene Candidates 1015.

At block 1199 the Device Registration Routine 1100 may conclude.

Figure 12:
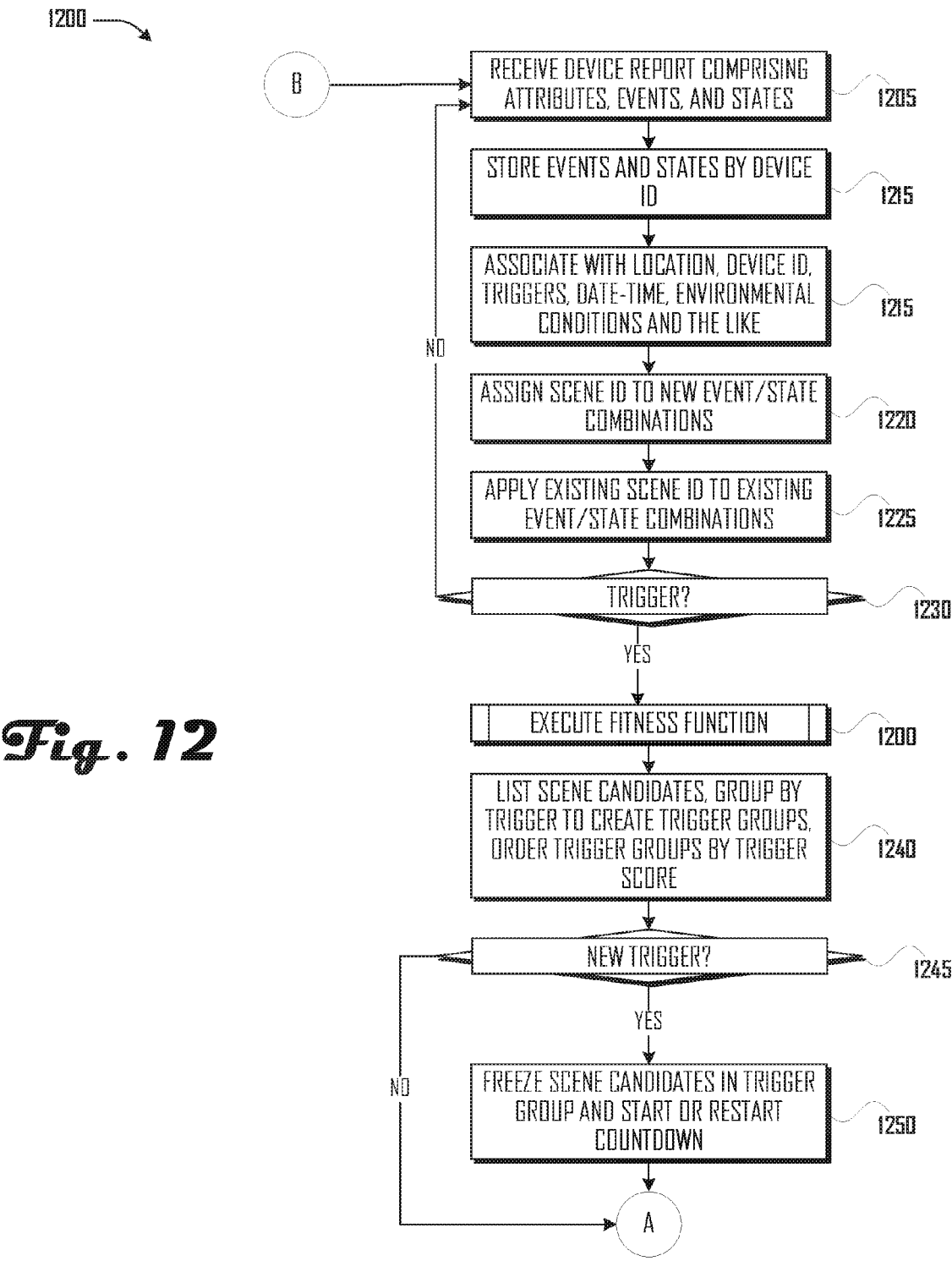
FIGS. 12 & 13 illustrate a flow of an example Scene Manager Routine, according to one or more embodiments.
Figure 13:
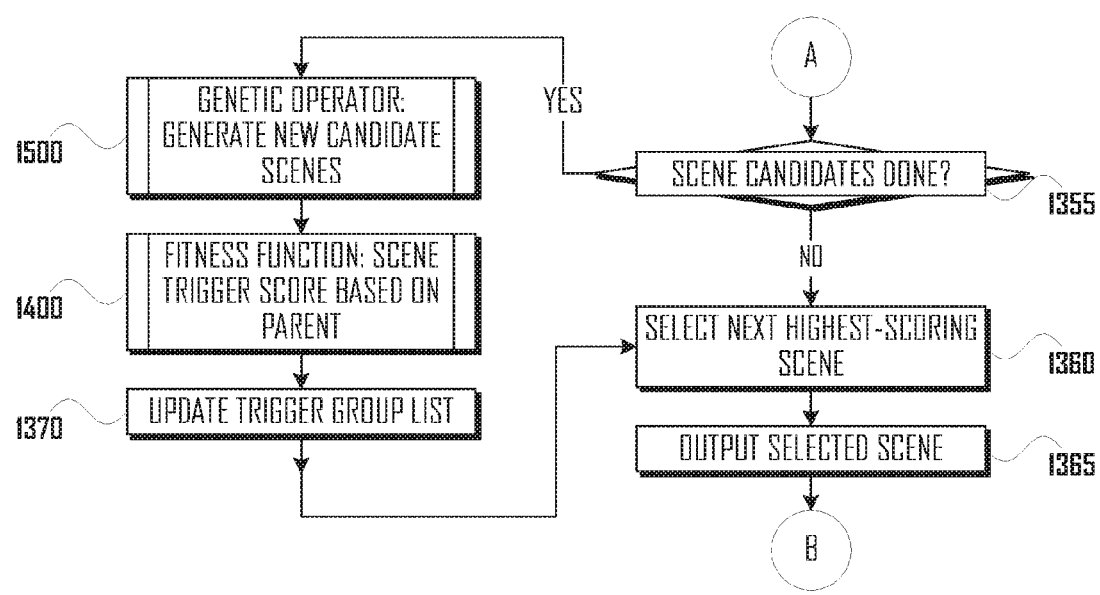

FIGS. 12 and 13 illustrate flow of an exemplary Scene Manager Routine 1200. At block 1205, the Scene Manager Routine 1200 receives at least one Device Report 1055 from at least one Controller 241. The Device Report 1055 comprises a Device ID 1060 or is associated with a Device ID 1060 via the information collected and processed by the Device Registration Routine 1100 (such as Attributes 1070). The Device Report 1055 comprises information conveying at least one of an Event 1005 and/or State 1010 (which may be communicated in the form of a Device Command 1035 or a Device Command 1035 acknowledgment). The Device Report 1055 may comprise information regarding multiple Event 1005 and/or State 1010 records. The Device Report 1055 may include or, via the Device ID 1060 (and the Attributes 1070 obtained by the Device Registration Routine 1100), may be associated with Attributes 1070, such as a Facility 240, as well as the Device Type 1045 of the Device 245 to which the Device Report 1055 relates. As discussed elsewhere herein, the distinction between Events 1005 and States 1010 may or may not be reported in the Device Report 1055; if not reported as such, the Scene Manager Routine 1200 may categorize Events 1005 and States 1010 in the Device Report 1055, such as based on the Device Type 1045 or other information developed or obtained during the Device Registration Routine 1100. The Device Report 1055 may include or be associated with a date-time record. The Device Report 1055 may be formatted according to an XML or JSON syntax and schema.

At block 1210, the Event 1005 and State 1010 records may be stored according to, for example, the Device ID 1060.

At block 1215, the Scene Manager Routine 1200 associates the stored Event 1005 and State 1010 information from the Device Reports 1055 with, for example, a Facility 240, whether the reported information comprises a Trigger 1030, a date-time stamp, weather or other environmental condition reported by the Environmental Information Source 280, Trigger Map 1050 parameters and the like.

At block 1220, the Scene Manager Routine 1200 may assign a Scene identifier, such as Scene 1020 record, to new Event 1005 and State 1010 combinations for one or more Devices 245 which have not previously been reported. In this way, users can directly control Events 1005 and States 1010 at Devices 245, with new Scenes 1020 being created for the user-created Event 1005 and State 1010 combinations.

At block 1225, the Scene Manager Routine 1200 may apply existing Scene identifiers, Scene 1020 records, to Event 1005 and State 1010 combinations which previously existed. The Scene Manager Routine 1200 may do this by comparing new Event 1005 and State 1010 combinations to existing Scene 1020 records, which may comprise Event 1005 and State 1010 combinations.

At block 1230, a determination may be made regarding whether the Device Report(s) 1055 of block 1205 contain an Event 1005 which is also a Trigger 1030.

If affirmative at block 1230, then at block 1400, the Scene Manager Routine 1200 executes the Fitness Function Subroutine 1400 on the Scenes 1020. The Fitness Function Subroutine 1400 is discussed further in relation to FIG. 14. The Fitness Function Subroutine 1400 scores the Scenes 1020. The Fitness Function Subroutine 1400 may be executed regardless of whether or not Events 1005 and States 1010 are received in the preceding blocks. The Fitness Function Subroutine 1400 outputs a list of Scenes 1020 and a Scene Trigger Score 1025 for each.

At block 1240, the output of the Fitness Function Subroutine 1400, a list of Scenes 1020 and Scene Trigger Scores 1025 for each, may be grouped by Trigger 1030 (or Event 1005) or sets of related Triggers 1030 (which may be determined by, for example, a Trigger Map 1050), creating a Trigger Group 1065, and the Trigger Groups 1065 may be ordered (within each Trigger Group 1065) by Scene Trigger Score 1025. At this block or another block, Scenes 1020 with a Scene Trigger Score 1025 below a threshold may be removed from or flagged in the Scene 1020 and Trigger Group 1065 list(s).

At block 1245, a determination may be made regarding whether the Device Report(s) 1055 of block 1205 contain a new Trigger 1030, e.g., a Trigger 1030 which is not a Trigger 1030 subject to a countdown period (discussed further below). If not, then the Scene Manager Routine 1200 may proceed to block 1355. If so, then at block 1250 the Scene Manager Routine 1200 may freeze the then-current Scene Candidates 1015 in the Trigger Group 1065 associated with the Trigger 1030 and may start a countdown. As described further herein, the countdown allows the Scene Candidates 1015 in the Trigger Group 1065 associated with the Trigger 1030 to be iterated through. As discussed herein, Triggers 1030 comprise Events 1005 which have been identified as Triggers 1030 by, for example, the Genetic Operator Subroutine 1500.

Turning to FIG. 13, at block 1355 a determination (or equivalent) may be made regarding whether all of the Scenes Candidates 1015 in the Trigger Group 1065 have been iterated through within the countdown period begun at block 1250. If the determination at block 1355 is negative, then at block 1360 the Scene Manager Routine 1200 selects the next-highest scoring Scene 1020 in the Scenes Candidates 1015 of the Trigger Group 1065, relative to the preceding Scenes Candidate 1015 selected within the countdown period (for the first time within the countdown period, the next-highest scoring Scene 1020 is the highest scoring Scene 1020 in the Trigger Group 1065).

At block 1365 the Scene 1020 selected at block 1360 is implemented, such as by obtaining the Device Commands 1035 comprising the Scene 1020, translating the Device Commands 1035 into the syntax native or unique to the Controller 241 or Device 245, such as via the Command Translator 1040 records, and then transmitting the translated Device Commands 1035 to the Controller(s) 241 for the Device(s) 245.

Proceeding from block 1355, at block 1500 a determination had been made at block 1355 that all of the Scenes 1020 in the Trigger Group frozen at block 1250 had been iterated through within the countdown period and at block 1500 the Genetic Operator Subroutine 1500 is invoked to generate new Scene Candidates 1015 for the Devices in the Facility 240. This process is discussed at greater length in relation to FIG. 15.

If more than one Scene Candidate 1015 is generated by the Genetic Operator 1500, then at block 1400, the Fitness Function Subroutine 1400 (or an equivalent process) is invoked to develop Scene Trigger Scores 1025 for the Scene Candidates 1015, for example, based on the Scene Trigger Scores 1025 assigned to the Scenes 1020 used to generate the Scene Candidates 1015.

At block 1370 the Trigger Group 1065 (from block 1240) is updated to include the generated Scene Candidates 1015, and the process continues at block 1360, with the next highest-scoring Scene 1020 being selected in ranked order.

Not shown, an escape or similar function may be provided to terminate the Scene Manager Routine 1200.

In this way, users can create new Scenes 1020 by setting Events 1005 and States 1010 in Devices 245; when an Event 1005 is detected which is also determined to be a Trigger 1030, which Trigger 1030 may be, for example, a user toggling a wall switch which is also a Controller 241 and a Device 245, the Scene Manager Routine 1200 understands the toggle to be a Trigger 1030 in a Trigger Group 1065 and implements the highest scoring Scene 1020 in the Trigger Group 1065. If the user does not want that Scene 1020, then the user may press the wall switch again (another instance of the Event 1005/Trigger 1030) before the countdown clock for the frozen Trigger Group 1065 has finished, causing the Scene Manager Routine 1200 to implement the next-highest scoring Scene 1020 in the Trigger Group 1065. If the user does not want that Scene 1020, then the user may press the wall switch again (another instance of the Event 1005/Trigger 1030), leading to the next-highest scoring Scene 1020 in the Trigger Group 1065. When all the Scenes 1020 are exhausted and the user continues to press the wall switch, the Scene Manager Routine 1200 invokes the Genetic Operator 1500 to generate new Scene Candidates 1015 and adds them to the list of Scenes 1020 in the Trigger Group 1065, which the user can then settle on (by not causing Events 1005 at the Device 245) or not (by causing Events 1005 which are Triggers 1030 for the active Trigger Group 1065).

As noted above, the user is also able to directly set Events 1005 and States 1010 for Devices 245 in the Facility 240; if a combination of Events 1005 and States 1010 is new, then a new Scene 1020 will be created and scored by the Fitness Function Subroutine 1400. Thus, when the user's behavior in a location follows a routine, existing Scenes 1020 will be implemented. When the user's behavior in a location changes, new Scenes 1020 are created, either by the Genetic Operator 1500 or by the user setting Event 1005 and States 1010 for Devices 245, and the new Scenes 1020 are scored. If the user's behavior over time follows the new, changed, pattern, then the new Scenes 1020 become the new output.

Figure 14:
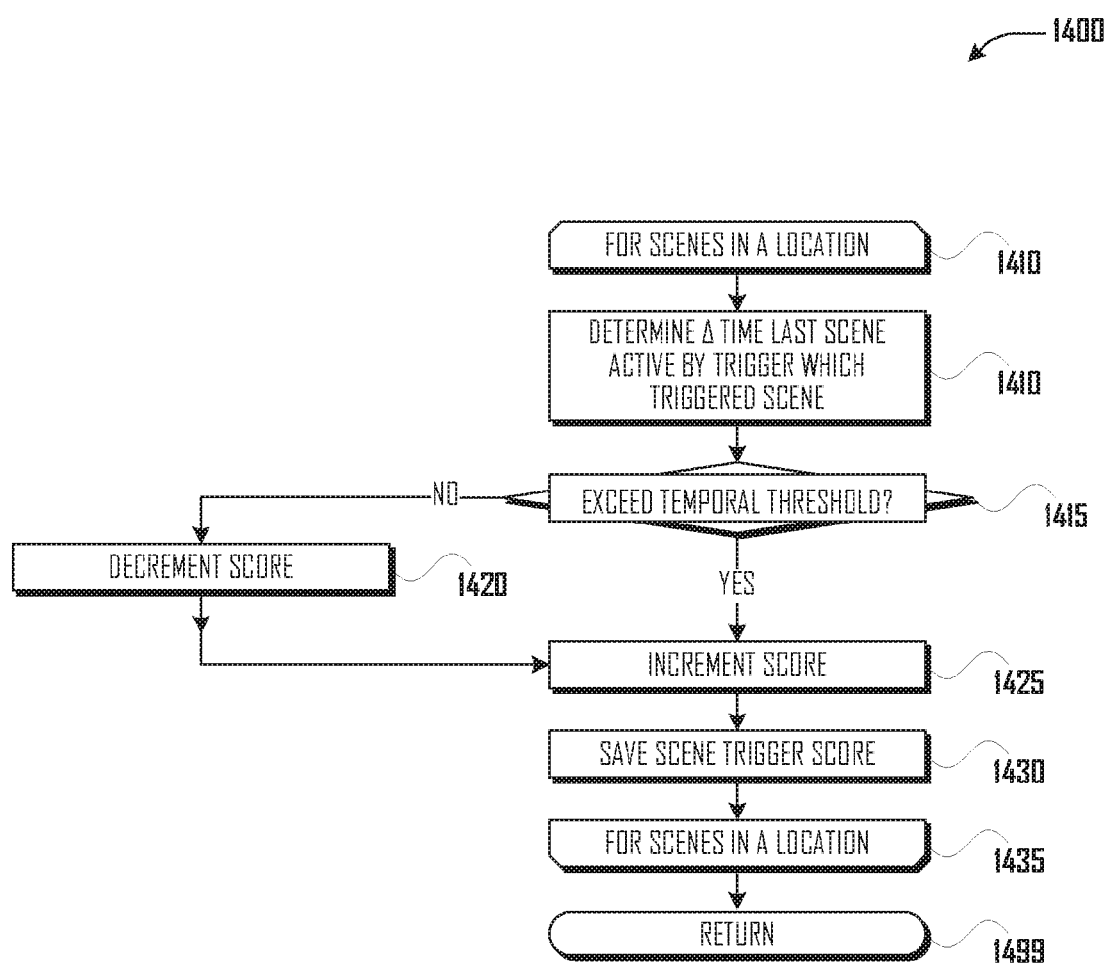
FIG. 14 illustrates a flow of an example Fitness Function subroutine, according to one or more embodiments.

FIG. 14 illustrates an example of the Fitness Function Subroutine 1400 illustrated in FIGS. 12 & 13. Blocks 1405 through 1435 may be performed for all Scenes 1020 associated with a particular Facility 240.

At block 1410, the amount of time the last Scene 1020 was active for is determined. At block 1415 a determination (or equivalent) may be made regarding whether a temporal threshold for activity of the Scene 1020 was exceeded. If the temporal threshold was exceeded, then at block 1425 the Scene Trigger Score 1025 for the Scene 1020 may be incremented by an amount. If the temporal threshold was not exceeded, then at block 1420 the Scene Trigger Score 1025 for the Scene 1020 may be decremented by an amount.

At block 1430 the Scene Trigger Scores of the Scenes 1020 may be saved.

Figure 15:
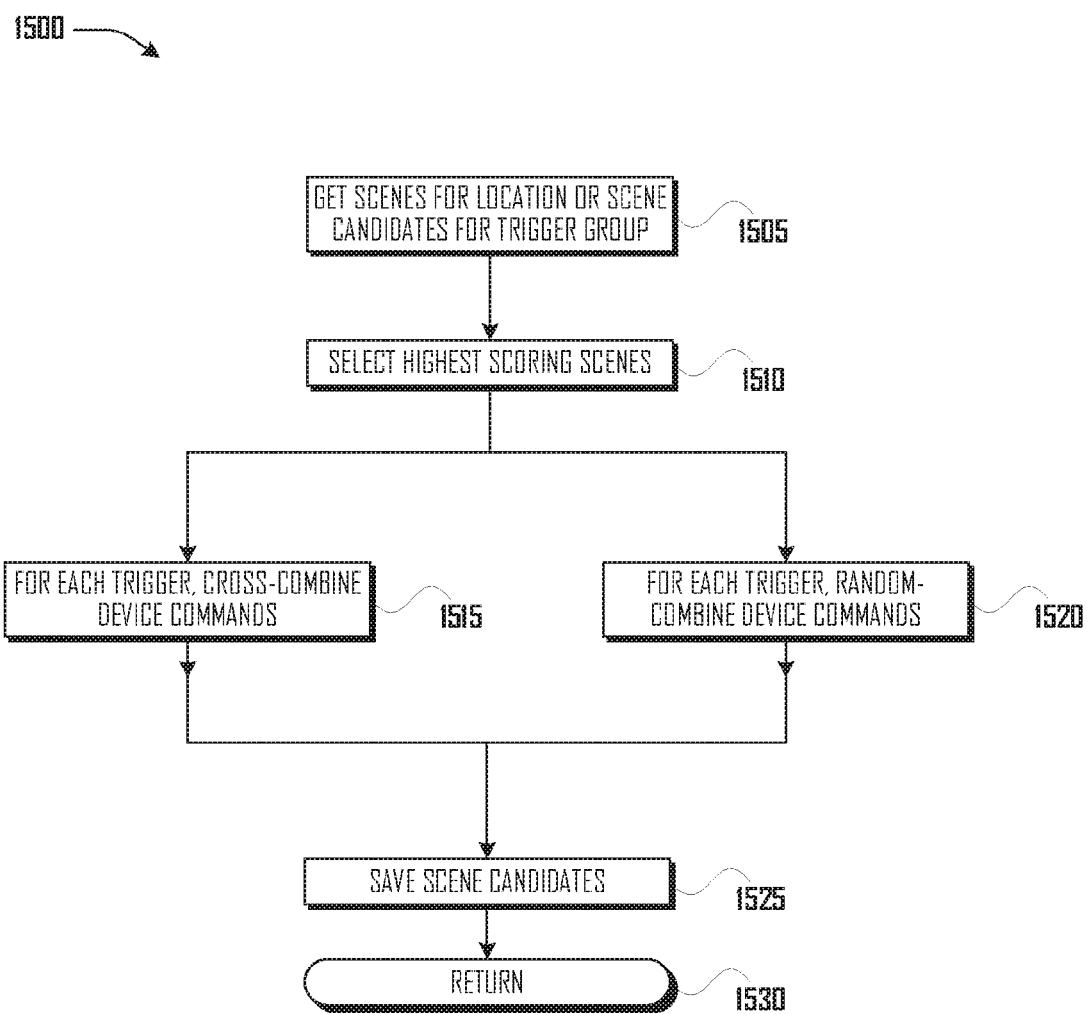
FIG. 15 illustrates a flow of an example Genetic Operator subroutine, according to one or more embodiments.

FIG. 15 illustrates an example of the Genetic Operator Subroutine 1500 illustrated in FIGS. 12 & 13. At block 1505, the Scenes 1020 associated with a Facility 240 are selected. Alternatively, the Scene Candidates 1015 associated with a Trigger Group 1065 may be selected.

At block 1510 the Scenes 1020 or Scene Candidates 1015 with the highest Scene Trigger Score 1025 may be selected. The threshold may, for example, be a numeric score or it may be a selection of a number of Scenes 1020 or Scene Candidates 1015, starting with the Scene 1020 or Scene Candidate 1015 with the highest Scene Trigger Score 1025.

Blocks 1515 and 1520 present alternative or complementary examples of ways new Scene Candidates 1015 may be generated. At block 1515 the Device Commands 1035 for Devices 245 in the selected Scenes 1020 may be cross-combined and associated with Triggers 1030 in the Facility, such as Triggers 1030 for the selected Scenes 1020, producing a matrix of Scene Candidates 1015 by Trigger 1030. At block 1520, a random selection of Device Commands 1035 for Devices by Trigger 1030 in the Facility 240 may be generated, regardless of Event 1005 and State 1010 combinations in other Scenes 1020. Not shown, Scene Candidates 1015 generated at either block 1515 or 1520 and which are the same as the existing Scenes 1020 may be eliminated.

At block 1525 the generated Scene Candidates 1015 are saved. Referring to FIG. 3, a Device in a Facility has two Triggers 1030, Trigger 305A and Trigger 305B. Each Trigger is associated with Scene Candidates generated by the process illustrated in FIG. 15. The generated Scene Candidates are added to the Trigger Group 1065 list, such as at block 1370, and are presented and cycled through or settled upon by the user, as discussed in relation to FIGS. 12 and 13. FIG. 3 illustrates that two different Triggers 305A and 305B in one Facility may be associated with the same Scene 1020, in the example illustrated in FIG. 3, Scene 315A.

Following is a table of Scenes in a Facility 240 comprising two Devices 245, which Devices 245 have three available power levels, 0, 50%, and 100%.

|         | Device 1/Device 2 power levels |
|---------|-------------------------------|
| Scene 1 | 0/0                           |
| Scene 2 | 50/0                          |
| Scene 3 | 100/0                         |
| Scene 4 | 0/50                          |
| Scene 5 | 50/50                         |
| Scene 6 | 100/50                        |
| Scene 7 | 0/100                         |
| Scene 8 | 50/100                        |
| Scene 9 | 100/100                       |

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A machine-teaching environmental control method comprising:
    transistor-based circuitry (at a hub 705 or server 900, e.g.) configured to obtain first, second, and third output configurations (scenes 1020, e.g.) that all correspond to a first trigger 1030 and that are respectively associated with first, second, and third scalar scores (scene trigger scores 1025 or scalar components thereof, e.g.);
    transistor-based circuitry configured to present the first output configuration in response to a first sequential instance of the first trigger and to said scalar scores indicating that the first output configuration is ranked before the second output configuration;
    transistor-based circuitry configured to present the second output configuration in response to a second sequential instance of the first trigger and to said scalar scores indicating that the second output configuration is ranked before the third output configuration;

transistor-based circuitry configured to present the third output configuration in response to a third sequential instance of the first trigger after the first and second output configuration are presented (defining an arbitrary ab initio sequence 735A of the first, second, and third output configurations, e.g.); and transistor-based circuitry configured to present a modified sequence 735 (modified from the prior instance by the second output configuration now being before the first, e.g.) of the first, second, and third output configurations in response to a first change in the second scalar score resulting from a magnitude of a time interval between the second and third sequential instances of the first trigger, wherein said presentation sequence is manifested in a plurality of physical control devices (environmental control devices 245 or other output-capable mounted devices 701-702 configured to present a scene to one or more occupants, e.g.) and wherein said plurality of physical control devices include first and second physical control devices mounted at a first facility 140 and operably coupled with the first hub.

12. The system of SYSTEM CLAUSE 1, wherein said transistor-based circuitry all resides in said hub 705 and in a proximity of said plurality of physical control devices.

3. The system of SYSTEM CLAUSE 1, wherein said transistor-based circuitry all resides in a server 900 remote from said hub and said physical control devices.

4. The system of SYSTEM CLAUSE 1, wherein some of said transistor-based circuitry resides in said hub and in a proximity of said plurality of physical control devices and wherein a remainder said transistor-based circuitry resides in a server 900 remote from said hub 705 and from said physical control devices.

5. The system of any of the above SYSTEM CLAUSES, wherein the system is configured to perform one of the METHOD CLAUSES set forth herein.

6. (Independent) A machine-teaching environmental control method comprising:

at a first hub (controller 241, e.g.) obtaining first, second, and third output configurations (scenes 1020, e.g.) that all correspond to a first trigger 1030 and that are respectively associated with first, second, and third scalar scores (scene trigger scores 1025 or scalar components thereof indicative of priority 801, e.g.);

presenting the first output configuration in response to a first sequential instance of the first trigger and to said scalar scores indicating that the first output configuration (blue scene 815A, e.g.) is ranked before the second output configuration;

presenting the second output configuration in response to a second sequential instance of the first trigger and to said scalar scores indicating that the second output configuration (green scene 815B or orange scene 815C, e.g.) is ranked before the third output configuration;

presenting the third output configuration in response to a third sequential instance of the first trigger after the first and second output configuration (red scene 815D, e.g.) are presented; and presenting a modified sequence 735 (in which green scene 815B is first or in which orange scene 815C is last, e.g.) of the first, second, and third output configurations in response to a first change in the second scalar score resulting from a magnitude of a time interval between the second and third sequential instances of the first trigger, wherein said presentation sequence is manifested in a plurality of physical control devices (environmental control devices 245 or other output-capable mounted devices 701-702 configured to present a scene to one or more occupants, e.g.) and wherein said plurality of physical control devices include first and second physical control devices at a first facility 140 and operably coupled with the first hub.

7. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score partly based on said magnitude of said time interval between successive timestamps respectively signifying said second and third sequential instances of said first trigger and partly based on one of the timestamps falling within a particular time-of-day.

8. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score partly based on said magnitude of said time interval between successive timestamps respectively signifying said second and third sequential instances of said first trigger and partly based on one of the timestamps falling within a particular time-of-day, the particular time-of-day being morning.

9. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score partly based on said magnitude of said time interval between successive timestamps respectively signifying said second and third sequential instances of said first trigger and partly based on one of the timestamps falling within a particular day-of-the-week set.

10. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score partly based on said magnitude of said time interval between successive timestamps respectively signifying said second and third sequential instances of said first trigger and partly based on one of the timestamps falling within a particular day-of-the-week set, the day-of-the-week set being weekdays.

11. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score partly based on said magnitude of said time interval between successive timestamps respectively signifying said second and third sequential instances of said first trigger and partly based on one of the timestamps falling within a particular time-of-year.

12. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score partly based on said magnitude of said time interval between successive timestamps respectively signifying said second and third sequential instances of said first trigger and partly based on one of the timestamps falling within a particular time-of-year, the particular time-of-year being December.

13. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score at least partly based on said magnitude of said time interval between successive timestamps respectively signifying said second and third sequential instances of said first trigger being more than a minimum interval, the minimum interval being within an order of magnitude of one second (tending to mitigate errors from occupant haste by attenuating or ignoring a historical measurement that is too small to be a reliable indicator of occupant preference, e.g.).

14. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

adjusting second scalar score at least partly based on said magnitude of said time interval between successive timestamps respectively signifying said second and third sequential instances of said first trigger being less than a maximum interval, the maximum interval being within an order of magnitude of one hour (tending to mitigate errors from occupant departure by attenuating or ignoring a historical measurement that is too large to be a reliable indicator of occupant preference, e.g.).

15. The method of any of the above METHOD CLAUSES, further comprising:

receiving a first device report from said first physical control device;

receiving a second device report from said second physical control device;

obtaining a list of (at least) several device reports that include the first and second device reports;

defining a first scene comprising (at least) a first combination of device events associated with said first trigger, said first scene having been received in prior device reports and being associated with a first user-specified scene identifier;

defining a second scene comprising a second combination of device events associated with said second trigger, said second scene not having been received in said prior device reports and being associated with a second user-specified scene identifier, wherein said first scene comprises said first output configuration and wherein said second scene comprises said second output configuration.

16. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

receiving a first device report from said first physical control device;

receiving a second device report from said second physical control device; and obtaining a list of thousands of device reports that include the first and second device reports sorted by location and by physical control device, wherein more than half of the thousands of device reports each include first event information, wherein event information that determines the magnitude of the time interval between the second and third sequential instances of the first trigger and that triggers the first change in the second scalar score includes the first event information and wherein said first scene comprises said first output configuration and wherein said second scene comprises said second output configuration.

17. The method of any of the above METHOD CLAUSES, further comprising:

receiving a first device report from said first physical control device;

receiving a second device report from said second physical control device;

obtaining a list of (at least) several device reports that include the first and second device reports sorted by location and by physical control device;

defining a first scene comprising (at least) a first combination of device events associated with said first trigger;

defining a second scene comprising a second combination of device events associated with said second trigger;

creating a first scene trigger group comprising multiple scenes associated (at least) with the first and second triggers, wherein said multiple scenes of said first scene trigger group include (at least) said first and second triggers; and determining a scene trigger score for each of the multiple scenes in the first scene trigger group utilizing at least a first fitness function, wherein said first scene comprises said first output configuration and wherein said second scene comprises said second output configuration and wherein the scene trigger scores include the first, second, and third scalar scores.

18. The method of any of the above METHOD CLAUSES, further comprising:

receiving a first device report from said first physical control device;

receiving a second device report from said second physical control device;

sorting several device reports that include the first and second device reports by location and by physical control device, wherein said sorting by location differentiates between the first facility and a second facility, wherein the several device reports include a device report from a third physical control that is mounted at the second facility and operably coupled with a second hub at the second facility, and wherein at least the sorting is performed at one or more servers operably coupled remotely with the first and second hubs;

defining a first scene comprising (at least) a first combination of device events associated with said first trigger;

defining a second scene comprising a second combination of device events associated with said second trigger;

creating a first scene trigger group comprising multiple scenes associated (at least) with the first and second triggers, wherein said multiple scenes of said first scene trigger group include (at least) said first and second triggers; and determining a scene trigger score for each of the multiple scenes in the first scene trigger group utilizing at least a first fitness function, wherein said first scene comprises said first output configuration and wherein said second scene comprises said second output configuration.

19. The method of any of the above METHOD CLAUSES, further comprising:

receiving a first device report from said first physical control device;

receiving a second device report from said second physical control device;

sorting several device reports that include the first and second device reports by location and by physical control device, wherein said sorting by location differentiates between the first facility and a second facility, wherein the several device reports include a device report from an other physical control that is mounted at the second facility and operably coupled with the first hub;

defining a first scene comprising (at least) a first combination of device events associated with said first trigger;

defining a second scene comprising a second combination of device events associated with said second trigger;

creating a first scene trigger group comprising multiple scenes associated (at least) with the first and second triggers, wherein said multiple scenes of said first scene trigger group include (at least) said first and second triggers; and determining a scene trigger score for each of the multiple scenes in the first scene trigger group utilizing at least a first fitness function, wherein said first scene comprises said first output configuration and wherein said second scene comprises said second output configuration.

20. The method of any of the above METHOD CLAUSES, further comprising:

receiving a first device report from said first physical control device;

receiving a second device report from said second physical control device;

sorting several device reports that include the first and second device reports by location and by physical control device;

defining a first scene comprising (at least) a first combination of device events associated with said first trigger;

defining a second scene comprising a second combination of device events associated with said second trigger;

creating a first scene trigger group comprising multiple scenes associated (at least) with the first and second triggers, wherein said multiple scenes of said first scene trigger group include (at least) said first and second triggers; and determining a scene trigger score for each of the multiple scenes in the first scene trigger group utilizing at least a first fitness function, wherein said first scene comprises said first output configuration and wherein said second scene comprises said second output configuration.

21. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device; and for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility.

22. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device;

for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and developing said first, second, and third scalar scores each as a scene trigger score by performing a fitness function on the several scene candidates.

23. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device;

for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and developing said first, second, and third scalar scores each as a scene trigger score by performing a fitness function on the several scene candidates, wherein the genetic operator comprises an arbitrary combination (according to random or pseudo-random selection of the respectively defined device sets, e.g.) of the first and second sets of device commands.

24. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device;

for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and developing said first, second, and third scalar scores each as a scene trigger score by performing a fitness function on the several scene candidates, wherein the fitness function comprises assigning a respective average scene trigger score for one or more scenes at a second facility (environmental output configurations remote from the first facility, e.g.) correlated to respective one of the several scene candidates (output configurations there deemed similar to a respective one of the scene candidates at the first facility, e.g.).

25. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device;

for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and developing said first, second, and third scalar scores each as a scene trigger score by performing a fitness function on the several scene candidates, wherein the fitness function comprises assigning a respective default scene trigger score for one or more scenes at a second facility (environmental output configurations remote from the first facility, e.g.) correlated to respective one of the several scene candidates (output configurations there deemed similar to a respective one of the scene candidates at the first facility, e.g.).

26. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device; and for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility.

27. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to the second physical control device;

for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and developing said first, second, and third scalar scores each as a scene trigger score by performing a fitness function on the several scene candidates.

28. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
obtaining a first set of device commands and attributes for said first physical control device;
obtaining a first device identifier assigned to said first physical control device;
obtaining a second set of device commands and attributes for said second physical control device;
obtaining a second device identifier assigned to the second physical control device;
for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and
developing said first, second, and third scalar scores each as a scene trigger score by performing a fitness function on the several scene candidates, wherein the genetic operator comprises an arbitrary combination (according to random or pseudo-random selection of the respectively defined device sets, e.g.) of the first and second sets of device commands.

29. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
obtaining a first set of device commands and attributes for said first physical control device;
obtaining a first device identifier assigned to said first physical control device;
obtaining a second set of device commands and attributes for said second physical control device;
obtaining a second device identifier assigned to the second physical control device;
for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and
developing said first, second, and third scalar scores each as a scene trigger score by performing a fitness function on the several scene candidates, wherein the fitness function comprises assigning a respective average scene trigger score for one or more scenes at a second facility (environmental output configurations remote from the first facility, e.g.) correlated to respective one of the several scene candidates (output configurations there deemed similar to a respective one of the scene candidates at the first facility, e.g.).

30. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
obtaining a first set of device commands and attributes for said first physical control device;
obtaining a first device identifier assigned to said first physical control device;
obtaining a second set of device commands and attributes for said second physical control device;
obtaining a second device identifier assigned to the second physical control device;
for at least the first and second physical control devices, generating several scene candidates by performing a genetic operator on the sets of device commands so that the first, second, and third output configurations each comprise a respective one of the several scene candidates, wherein the first and second set of attributes comprise a common location at the first facility; and
developing said first, second, and third scalar scores each as a scene trigger score by performing a fitness function on the several scene candidates, wherein the fitness function comprises assigning a respective default scene trigger score for one or more scenes at a second facility (environmental output configurations remote from the first facility, e.g.) correlated to respective one of the several scene candidates (output configurations there deemed similar to a respective one of the scene candidates at the first facility, e.g.).

31. The method of any of the above METHOD CLAUSES, wherein said first physical control device is an input-only device 701 not affected by said output configurations.

32. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
presenting a component of said second output configuration via the second physical control device, wherein the second physical control device is an input/output device 702.

33. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
presenting a component of said second output configuration via a third physical control device 703 at the first facility 140 and operably coupled with the first hub in a vicinity of the first and second physical control devices.

34. The method of any of the above METHOD CLAUSES, wherein said first physical control device is a wall-mounted switch that is operably coupled with a third physical control device 702, 703 only via the hub 705, wherein said first trigger comprises an actuation of said first physical control device 701, and wherein a first user-visible presentation in response to the actuation in a vicinity of the first physical control device is one of the first, second, or third output configurations.

35. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
downgrading the first scalar score as a conditional response to a determination that the magnitude of the time interval between the second and third sequential instances of the first trigger is larger than a maximum threshold (a user-selected or other suitable comparand, e.g.).

36. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
improving the second scalar score (i.e. tending to prioritize the second output configuration) as a conditional response to a determination that the magnitude of the time interval between the second and third sequential instances of the first trigger is smaller than a magnitude of the time interval between the first and second sequential instances of the first trigger, whereby the magnitude effectively determines a minimum threshold.

37. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
downgrading the first scalar score (i.e. tending to prioritize other output configurations relative to the first) as a conditional response to a determination that the magnitude of the time interval between the first and second sequential instances of the first trigger is smaller than a minimum threshold (a user-selected or other suitable comparand, e.g.).

38. The method of any of the above METHOD CLAUSES, wherein said presenting said modified sequence of said first, second, and third output configurations in response to said first change in said second scalar score resulting from said magnitude of said time interval between said second and third sequential instances of said first trigger comprises:
obtaining the magnitude of the time interval between the second and third sequential instances of the first trigger by computing a difference between when the second sequential instance of the first trigger occurred and when the third sequential instance of the first trigger occurred (as respective timestamps, e.g.);
obtaining a user-defined threshold either as a minimum threshold or as a maximum threshold, wherein the user-defined threshold is within an order of magnitude of 1 second; (or on the order of 1 second or of one minute or of one hour, e.g.) and
detecting the first change in the second scalar score as a conditional response to a comparison between the magnitude of the time interval between the second and third sequential instances of the first trigger.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A machine-teaching environmental control method comprising:
a first hub obtaining first, second, and third output configurations that all correspond to a first trigger and that are respectively associated with first, second, and third scalar scores;
presenting said first output configuration in response to a first sequential instance of said first trigger and to said scalar scores indicating that said first output configuration is ranked before said second output configuration;
presenting said second output configuration in response to a second sequential instance of said first trigger and to said scalar scores indicating that said second output configuration is ranked before said third output configuration;
presenting said third output configuration in response to a third sequential instance of said first trigger after said first and second output configuration are presented; and
presenting a modified sequence of said first, second, and third output configurations in response to a first change in said second scalar score resulting from a magnitude of a time interval between said second and third sequential instances of said first trigger either by increasing said second scalar score as a conditional response to a determination that said first magnitude of said time interval between said second and third sequential instances of said first trigger is smaller than a minimum threshold or by decreasing said second scalar score as a conditional response to a determination that said first magnitude of said time interval between said second and third sequential instances of said first trigger is larger than a maximum threshold, said maximum threshold being greater than said minimum threshold, wherein said presentation sequence is manifested in a plurality of physical control devices, wherein said plurality of physical control devices include first and second physical control devices at a first facility and operably coupled with said first hub, and wherein said presenting said modified sequence of said first, second, and third output configurations in response to said first change in said second scalar score resulting from said magnitude of said time interval between said second and third sequential instances of said first trigger comprises:
adjusting second scalar score partly based on said magnitude of said time interval between successive timestamps respectively signifying said second and third sequential instances of said first trigger and partly based on one of said timestamps falling within a particular time-of-day, said particular time-of-day being morning in combination with the remaining elements and features of the claimed invention.

2. The machine-teaching environmental control method of claim 1, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;
obtaining a first device identifier assigned to said first physical control device;
obtaining a second set of device commands and attributes for said second physical control device;
obtaining a second device identifier assigned to said second physical control device;
for at least said first and second physical control devices, generating several scene candidates by performing a genetic operator on said sets of device commands so that said first, second, and third output configurations each comprise a respective one of said several scene candidates, wherein said first and second set of attributes comprise a common location at said first facility; and
developing said first, second, and third scalar scores each as a scene trigger score by performing a fitness function on said several scene candidates, wherein said fitness function comprises assigning a respective average scene trigger score for one or more scenes at a second facility correlated to respective one of said several scene candidates.

3. A machine-teaching environmental control method comprising:
a first hub obtaining first, second, and third output configurations that all correspond to a first trigger and that are respectively associated with first, second, and third scalar scores;
presenting said first output configuration in response to a first sequential instance of said first trigger and to said scalar scores indicating that said first output configuration is ranked before said second output configuration;
presenting said second output configuration in response to a second sequential instance of said first trigger and to said scalar scores indicating that said second output configuration is ranked before said third output configuration;
presenting said third output configuration in response to a third sequential instance of said first trigger after said first and second output configuration are presented; and
presenting a modified sequence of said first, second, and third output configurations in response to a first change in said second scalar score resulting from a magnitude of a time interval between said second and third sequential instances of said first trigger, wherein said presentation sequence is manifested in a plurality of physical control devices, wherein said plurality of physical control devices include first and second physical control devices at a first facility and operably coupled with said first hub, and wherein said presenting said modified sequence of said first, second, and third output configurations in response to said first change in said second scalar score resulting from said magnitude of said time interval between said second and third sequential instances of said first trigger comprises:
adjusting second scalar score partly based on said magnitude of said time interval between successive timestamps respectively signifying said second and third sequential instances of said first trigger and partly based on one of said timestamps falling within a particular time-of-day, said particular time-of-day being morning.

4. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:
adjusting second scalar score partly based on said magnitude of said time interval between successive timestamps respectively signifying said second and third sequential instances of said first trigger and partly based on one of said timestamps falling within a particular time-of-day.

5. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:
adjusting second scalar score partly based on said magnitude of said time interval between successive timestamps respectively signifying said second and third sequential instances of said first trigger and partly based on one of said timestamps falling within a particular day-of-the-week set.

6. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:
adjusting second scalar score partly based on said magnitude of said time interval between successive timestamps respectively signifying said second and third sequential instances of said first trigger and partly based on one of said timestamps falling within a particular time-of-year.

7. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:
receiving a first device report from said first physical control device;
receiving a second device report from said second physical control device; and
obtaining a list of thousands of device reports that include said first and second device reports sorted by location and by physical control device, wherein more than half of said thousands of device reports each include first event information, wherein event information that determines said magnitude of said time interval between said second and third sequential instances of said first trigger and that triggers said first change in said second scalar score includes said first event information and wherein said first scene comprises said first output configuration and wherein said second scene comprises said second output configuration.

8. The machine-teaching environmental control method of claim 3, further comprising:
receiving a first device report from said first physical control device;
receiving a second device report from said second physical control device;
sorting several device reports that include said first and second device reports by location and by physical control device, wherein said sorting by location differentiates between said first facility and a second facility, wherein said several device reports include a device report from a third physical control that is mounted at said second facility and operably coupled with a second hub at said second facility, and wherein at least said sorting is performed at one or more servers operably coupled remotely with said first and second hubs;

defining a first scene comprising a first combination of device events associated with said first trigger;

defining a second scene comprising a second combination of device events associated with said second trigger;

creating a first scene trigger group comprising multiple scenes associated with said first and second triggers, wherein said multiple scenes of said first scene trigger group include said first and second triggers; and determining a scene trigger score for each of said multiple scenes in said first scene trigger group utilizing at least a first fitness function, wherein said first scene comprises said first output configuration and wherein said second scene comprises said second output configuration.

9. The machine-teaching environmental control method of claim 3, further comprising:

receiving a first device report from said first physical control device;

receiving a second device report from said second physical control device;

sorting several device reports that include said first and second device reports by location and by physical control device;

defining a first scene comprising a first combination of device events associated with said first trigger;

defining a second scene comprising a second combination of device events associated with said second trigger;

creating a first scene trigger group comprising multiple scenes associated with said first and second triggers, wherein said multiple scenes of said first scene trigger group include said first and second triggers; and determining a scene trigger score for each of said multiple scenes in said first scene trigger group utilizing at least a first fitness function, wherein said first scene comprises said first output configuration and wherein said second scene comprises said second output configuration.

10. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to said second physical control device; and for at least said first and second physical control devices, generating several scene candidates by performing a genetic operator on said sets of device commands so that said first, second, and third output configurations each comprise a respective one of said several scene candidates, wherein said first and second set of attributes comprise a common location at said first facility.

11. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to said second physical control device;

for at least said first and second physical control devices, generating several scene candidates by performing a genetic operator on said sets of device commands so that said first, second, and third output configurations each comprise a respective one of said several scene candidates, wherein said first and second set of attributes comprise a common location at said first facility; and developing said first, second, and third scalar scores each as a scene trigger score by performing a fitness function on said several scene candidates.

12. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to said second physical control device;

for at least said first and second physical control devices, generating several scene candidates by performing a genetic operator on said sets of device commands so that said first, second, and third output configurations each comprise a respective one of said several scene candidates, wherein said first and second set of attributes comprise a common location at said first facility; and developing said first, second, and third scalar scores each as a scene trigger score by performing a fitness function on said several scene candidates, wherein said fitness function comprises assigning a respective default scene trigger score for one or more scenes at a second facility correlated to respective one of said several scene candidates.

13. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to said second physical control device; and for at least said first and second physical control devices, generating several scene candidates by performing a genetic operator on said sets of device commands so that said first, second, and third output configurations each comprise a respective one of said several scene candidates, wherein said first and second set of attributes comprise a common location at said first facility.

14. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

obtaining a first set of device commands and attributes for said first physical control device;

obtaining a first device identifier assigned to said first physical control device;

obtaining a second set of device commands and attributes for said second physical control device;

obtaining a second device identifier assigned to said second physical control device;

for at least said first and second physical control devices, generating several scene candidates by performing a genetic operator on said sets of device commands so that said first, second, and third output configurations each comprise a respective one of said several scene candidates, wherein said first and second set of attributes comprise a common location at said first facility; and developing said first, second, and third scalar scores each as a scene trigger score by performing a fitness function on said several scene candidates, wherein said genetic operator comprises an arbitrary combination of said first and second sets of device commands.

15. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

downgrading said first scalar score as a conditional response to a determination that said magnitude of said time interval between said second and third sequential instances of said first trigger is larger than a maximum threshold.

16. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

improving said second scalar score as a conditional response to a determination that said magnitude of said time interval between said second and third sequential instances of said first trigger is smaller than a magnitude of said time interval between said first and second sequential instances of said first trigger, whereby said magnitude effectively determines a minimum threshold.

17. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

downgrading said first scalar score as a conditional response to a determination that said magnitude of said time interval between said first and second sequential instances of said first trigger is smaller than a minimum threshold.

18. The machine-teaching environmental control method of claim 3, wherein said presenting said modified sequence of said first, second, and third output configurations in response to said first change in said second scalar score resulting from said magnitude of said time interval between said second and third sequential instances of said first trigger comprises:

obtaining said magnitude of said time interval between said second and third sequential instances of said first trigger by computing a difference between when said second sequential instance of said first trigger occurred and when said third sequential instance of said first trigger occurred;

obtaining a user-defined threshold either as a minimum threshold or as a maximum threshold, wherein said user-defined threshold is within an order of magnitude of one minute; and detecting said first change in said second scalar score as a conditional response to a comparison between said magnitude of said time interval between said second and third sequential instances of said first trigger.

19. A machine-teaching environmental control system comprising:

transistor-based circuitry configured to obtain first, second, and third output configurations that all correspond to a first trigger and that are respectively associated with first, second, and third scalar scores;

transistor-based circuitry configured to present said first output configuration in response to a first sequential instance of said first trigger and to said scalar scores indicating that said first output configuration is ranked before said second output configuration;

transistor-based circuitry configured to present said second output configuration in response to a second sequential instance of said first trigger and to said scalar scores indicating that said second output configuration is ranked before said third output configuration;

transistor-based circuitry configured to present said third output configuration in response to a third sequential instance of said first trigger after said first and second output configuration are presented; and transistor-based circuitry configured to present a modified sequence of said first, second, and third output configurations in response to a first change in said second scalar score resulting from a magnitude of a time interval between said second and third sequential instances of said first trigger, wherein said presentation sequence is manifested in a plurality of physical control devices, wherein said plurality of physical control devices include first and second physical control devices at a first facility and operably coupled with said first hub, and wherein said transistor-based circuitry configured to present said modified sequence of said first, second, and third output configurations in response to said first change in said second scalar score resulting from said magnitude of said time interval between said second and third sequential instances of said first trigger comprises:
transistor-based circuitry configured to adjust second scalar score partly based on said magnitude of said time interval between successive timestamps respectively signifying said second and third sequential instances of said first trigger and partly based on one of said timestamps falling within a particular time-of-day, said particular time-of-day being morning.

* * * * *